US011635772B2

(12) United States Patent
Pizarro et al.

(10) Patent No.: US 11,635,772 B2
(45) Date of Patent: Apr. 25, 2023

(54) UNMANNED AERIAL VEHICLE WITH SYNCHRONIZED SENSOR NETWORK

(71) Applicant: Romaeris Corporation, Ottawa (CA)

(72) Inventors: Anthony F. Pizarro, Ottawa (CA); Bruno C. Doerwald, Ottawa (CA)

(73) Assignee: ROMAERIS CORPORATION, Ottawa (CA)

( * ) Notice: Subject to any disclaimer, the term of this patent is extended or adjusted under 35 U.S.C. 154(b) by 394 days.

(21) Appl. No.: 16/618,027

(22) PCT Filed: Jun. 1, 2018

(86) PCT No.: PCT/CA2018/050657
§ 371 (c)(1),
(2) Date: Nov. 27, 2019

(87) PCT Pub. No.: WO2018/218370
PCT Pub. Date: Dec. 6, 2018

(65) Prior Publication Data
US 2020/0192404 A1 Jun. 18, 2020

Related U.S. Application Data

(60) Provisional application No. 62/513,675, filed on Jun. 1, 2017.

(51) Int. Cl.
*G05D 1/08* (2006.01)
*B64C 23/06* (2006.01)
(Continued)

(52) U.S. Cl.
CPC ............. *G05D 1/0808* (2013.01); *B64C 1/26* (2013.01); *B64C 3/52* (2013.01); *B64C 13/30* (2013.01);
(Continued)

(58) Field of Classification Search
CPC .......... G05D 1/0808; B64C 1/26; B64C 3/52; B64C 13/30; B64C 13/50; B64C 23/072;
(Continued)

(56) References Cited

U.S. PATENT DOCUMENTS 3,152,778 A * 10/1964 Girard ................... B64C 31/032
244/233
6,346,025 B1 * 2/2002 Tachau ................... A63H 17/34
403/114
(Continued)

FOREIGN PATENT DOCUMENTS

CN 102428001 A * 4/2012 ............. B64C 27/52
CN 103847963 6/2014
(Continued)

OTHER PUBLICATIONS

Extended European Search Report dated Feb. 8, 2021, in corresponding European application 18810496.2.

*Primary Examiner* — Donald J Wallace
*Assistant Examiner* — Jalal C Coduroglu
(74) *Attorney, Agent, or Firm* — Womble Bond Dickinson (US) LLP

(57) ABSTRACT

Disclosed is an aircraft and a method of controlling an aircraft. The aircraft comprises a continuous wing assembly extending from port to starboard sides of the aircraft. The aircraft is controlled partially by flexing portions of the wing, and partially or totally by mechanical systems that alter the position of a fuselage with respect to the wing. The fuselage is attached to the wing by a wing/fuselage joint structure that permits at least two mutually orthogonal axes of rotation of the fuselage relative to the wing. The aircraft includes a sensors, a telemetry system linked to a remote server, and a control system for programming flight information and aircraft control instructions and a plurality of actuators responsive to the control system for rotating the (Continued)

fuselage relative to the wing and flexing the wing for controlling the flight of the aircraft in response to instructions from the control system.

26 Claims, 27 Drawing Sheets

(51) Int. Cl.
| | |
|---|---|
| *B64C 1/26* | (2006.01) |
| *B64C 3/52* | (2006.01) |
| *B64C 13/30* | (2006.01) |
| *B64C 13/50* | (2006.01) |
| *B64C 31/028* | (2006.01) |
| *B64C 39/02* | (2006.01) |

(52) U.S. Cl.
CPC ............ *B64C 13/50* (2013.01); *B64C 23/072* (2017.05); *B64C 31/028* (2013.01); *B64C 39/024* (2013.01); *B64C 2201/102* (2013.01); *B64C 2201/141* (2013.01)

(58) Field of Classification Search
CPC ................ B64C 31/028; B64C 39/024; B64C 2201/102; B64C 2201/141; B64C 2201/02; B64C 2201/104
See application file for complete search history.

(56) References Cited

U.S. PATENT DOCUMENTS

| | | | |
|---|---|---|---|
| 9,563,201 B1* | 2/2017 | Tofte | G05D 1/0038 |
| 2001/0051488 A1* | 12/2001 | Tachau | A63H 17/34 |
| | | | 446/397 |
| 2003/0141409 A1* | 7/2003 | Lisoski | B64C 3/42 |
| | | | 244/13 |
| 2006/0011777 A1* | 1/2006 | Ariton | B64C 39/024 |
| | | | 244/7 B |
| 2008/0001028 A1* | 1/2008 | Kendall | H04B 7/18504 |
| | | | 244/75.1 |
| 2010/0193625 A1* | 8/2010 | Sommer | B64C 37/02 |
| | | | 244/2 |
| 2011/0036939 A1* | 2/2011 | Easter | B64C 37/02 |
| | | | 244/46 |
| 2011/0315806 A1* | 12/2011 | Piasecki | B64D 17/80 |
| | | | 244/2 |
| 2012/0056031 A1* | 3/2012 | Lading | B64C 27/52 |
| | | | 701/3 |
| 2012/0261523 A1* | 10/2012 | Shaw | B64C 29/0033 |
| | | | 244/7 R |
| 2013/0099060 A1* | 4/2013 | Dees | B64C 3/58 |
| | | | 244/199.4 |
| 2015/0097076 A1* | 4/2015 | Lakic | B64C 3/38 |
| | | | 244/46 |
| 2015/0217613 A1* | 8/2015 | Piasecki | B64C 27/08 |
| | | | 701/2 |
| 2016/0260207 A1* | 9/2016 | Fryshman | G06K 9/6256 |
| 2016/0284221 A1* | 9/2016 | Hinkle | G08G 5/0069 |
| 2016/0292403 A1* | 10/2016 | Gong | G08G 5/006 |
| 2018/0370624 A1* | 12/2018 | Seale | B64C 27/24 |

FOREIGN PATENT DOCUMENTS

| | | | | |
|---|---|---|---|---|
| CN | 103847963 A | * | 6/2014 | |
| FR | 2 303 710 | | 10/1976 | |
| JP | 2001039397 A | * | 2/2001 | ............ B64C 27/52 |
| WO | WO-2010127675 A2 | * | 11/2010 | ............ B64C 27/52 |
| WO | WO 2011/023908 | | 3/2011 | |
| WO | WO-2011023908 A1 | * | 3/2011 | ........... B64C 31/032 |
| WO | WO-2011066031 A2 | * | 6/2011 | ............ B64C 39/024 |
| WO | WO-2011146349 A2 | * | 11/2011 | ............ G05D 1/102 |
| WO | WO-2015189518 A1 | * | 12/2015 | ............... B64C 3/16 |
| WO | WO-2016172251 A1 | * | 10/2016 | .......... G06F 11/1484 |

* cited by examiner

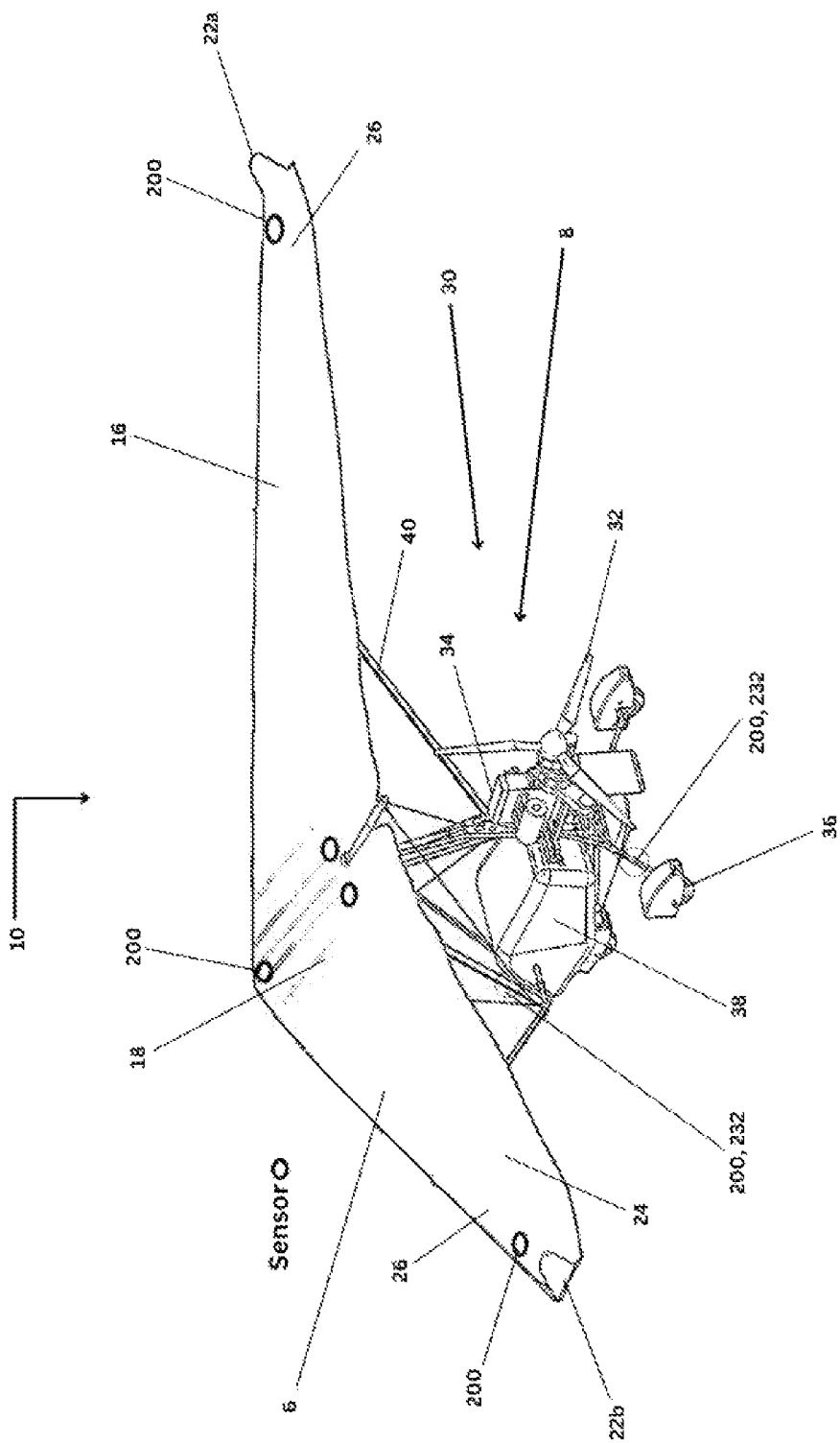

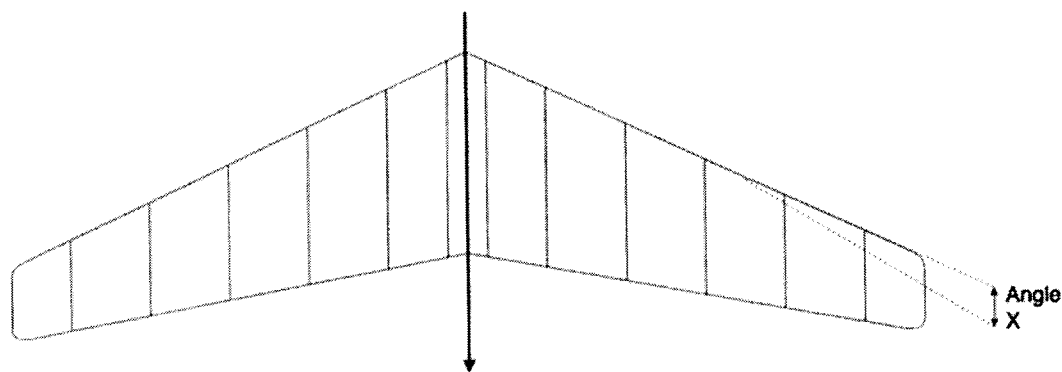
FIG. 6
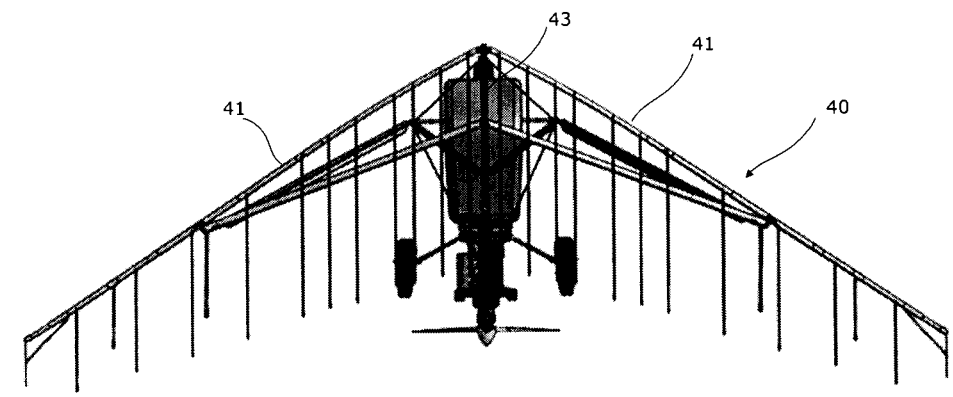
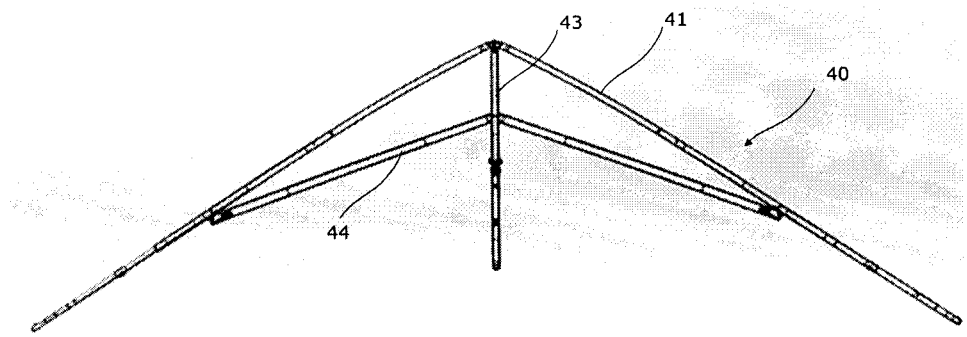
FIG. 7

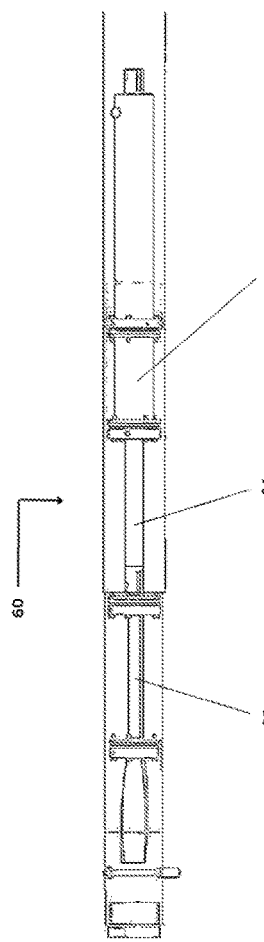
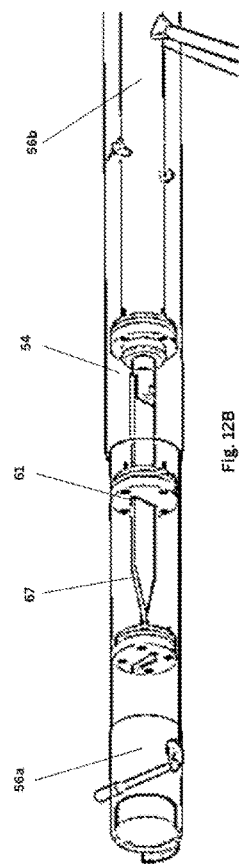
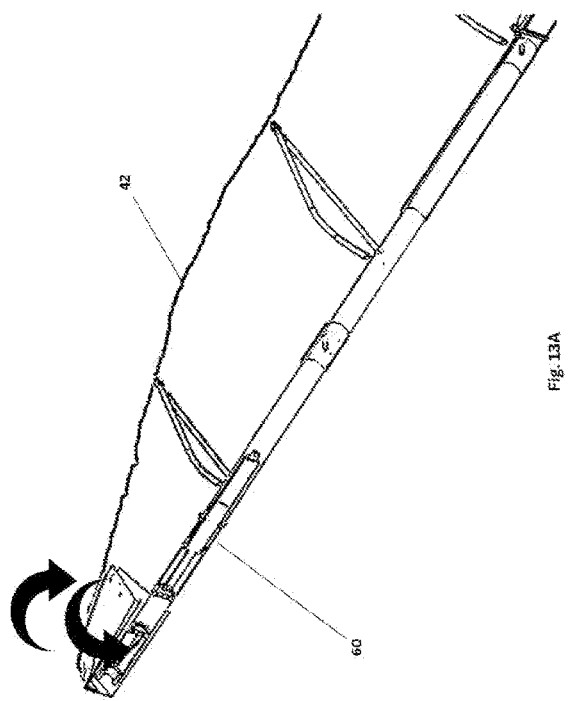
Fig. 12A
Fig. 12B
Fig. 13A

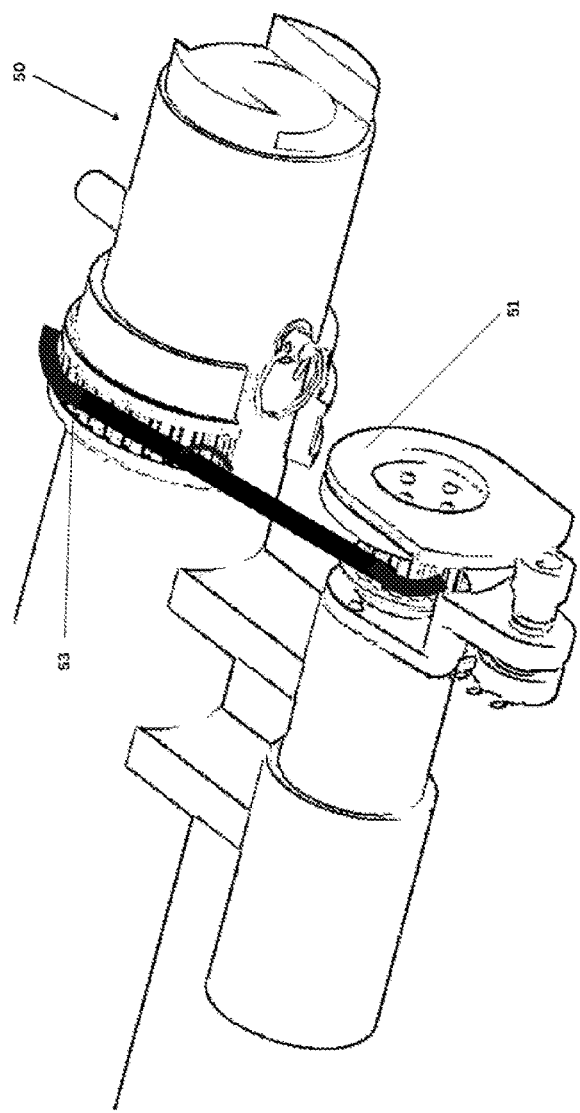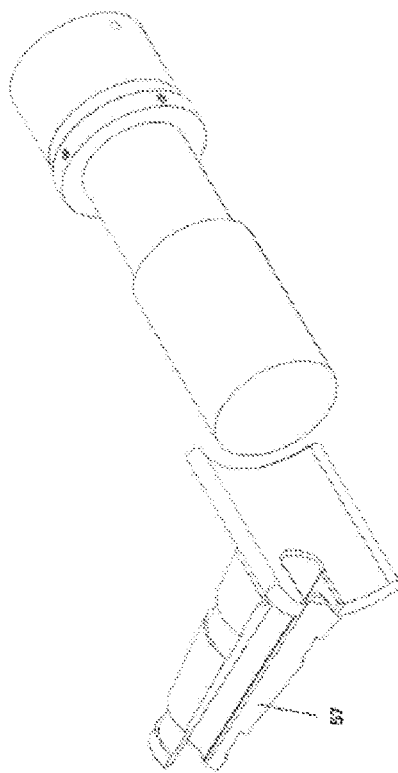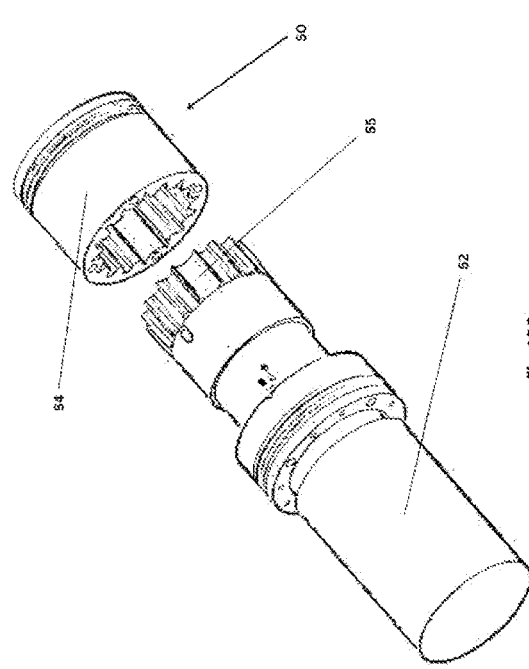

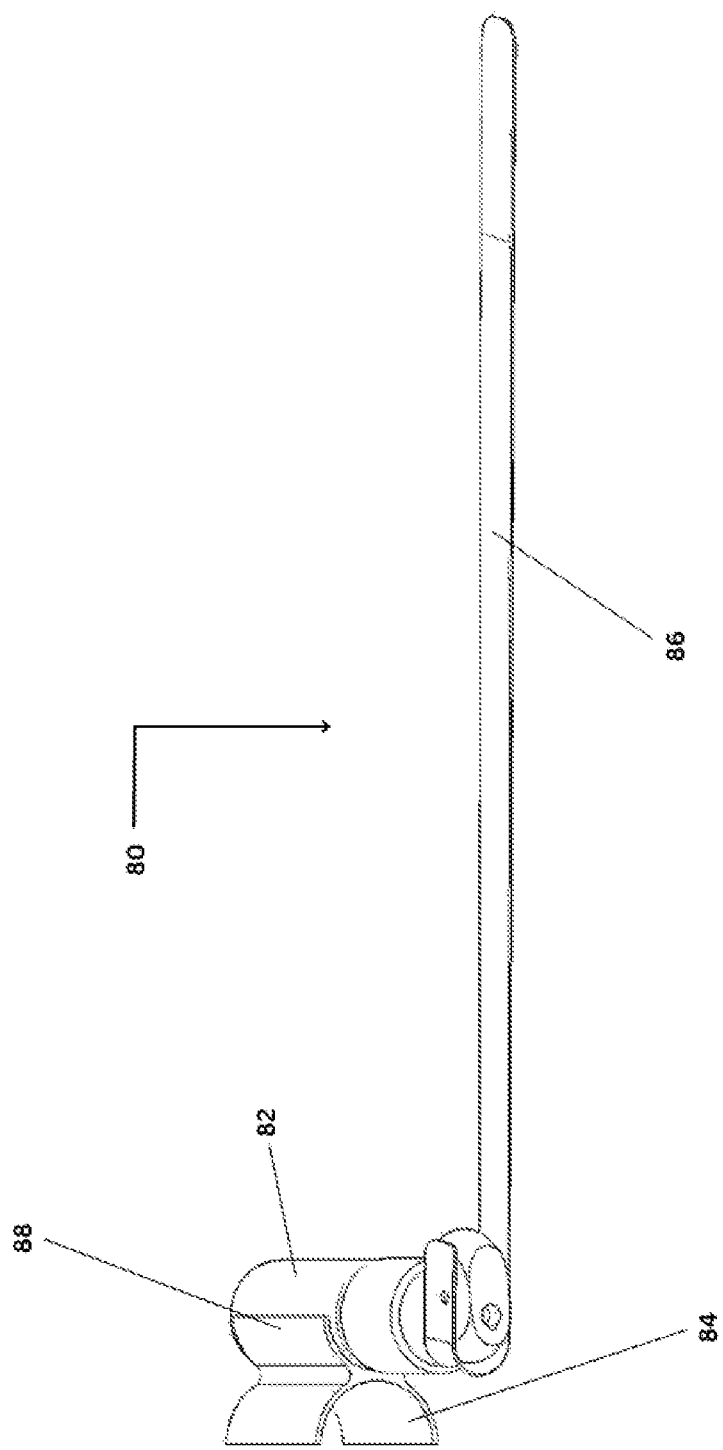

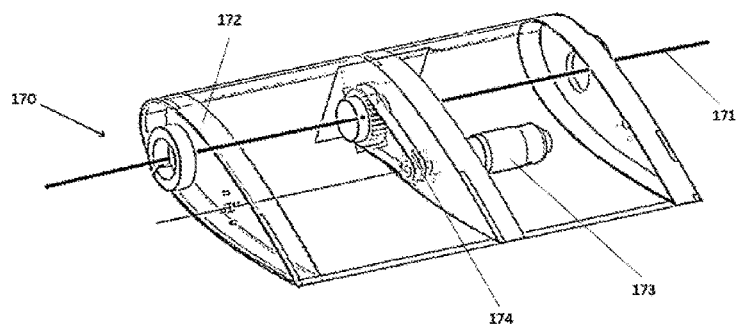
Fig. 30
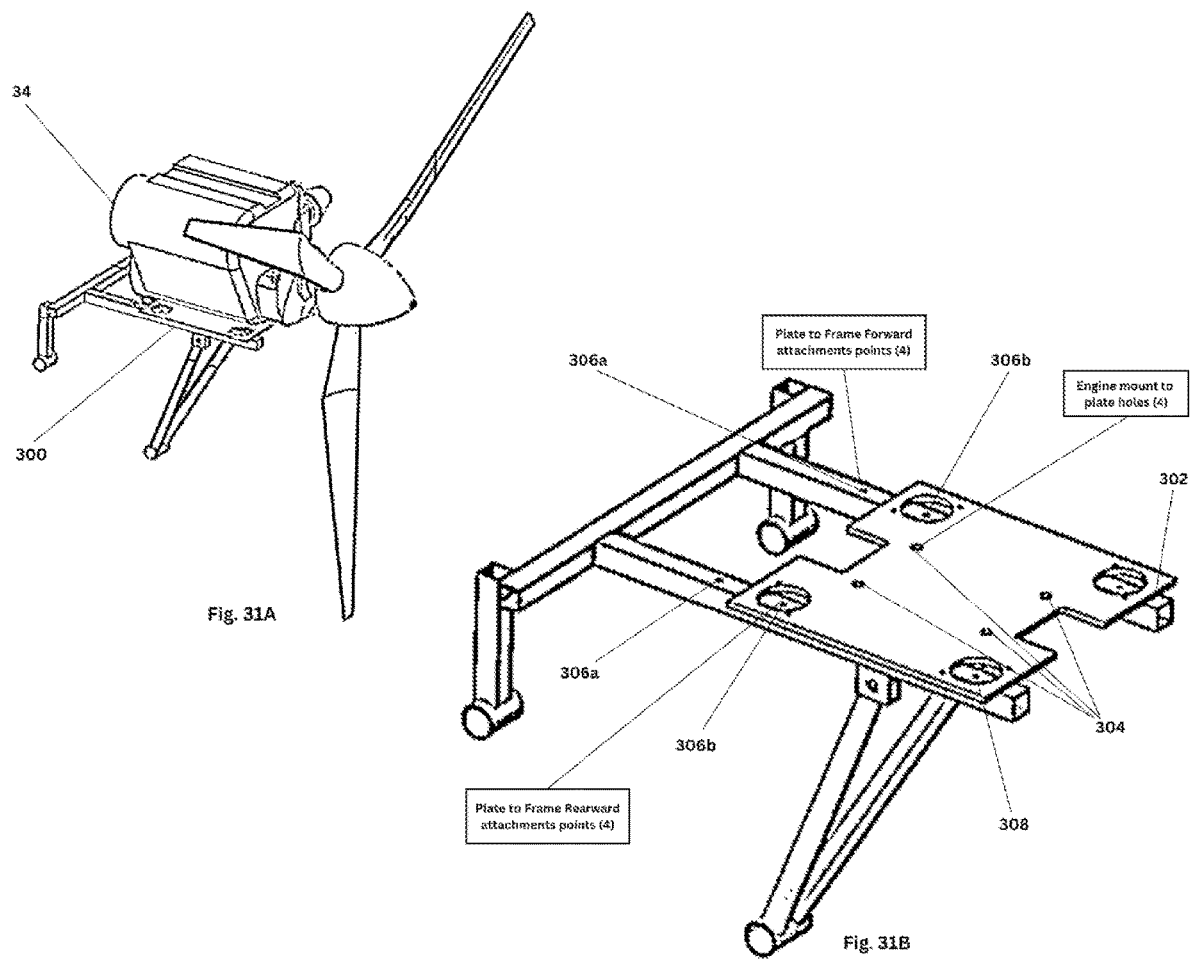
Fig. 31A
Fig. 31B

UNMANNED AERIAL VEHICLE WITH SYNCHRONIZED SENSOR NETWORK

CROSS-REFERENCE TO RELATED APPLICATIONS

This application is a national stage filing under 35 U.S.C. 371 of PCT/CA2018/050657, filed Jun. 1, 2018, which International Application was published by the International Bureau in English on Dec. 6, 2018, as International Publication No. WO 2018/218370, and application claims priority to U.S. Provisional Patent Application No. 62/513,675 titled "UNMANNED AERIAL VEHICLE WITH SYNCHRONIZED SENSOR NETWORK" filed Jun. 1, 2017, which applications are hereby incorporated by reference in their entirety in this application.

FIELD

The present disclosure relates to aircraft and in particular, systems for the autonomous and/or remote control of weight-shift control, flexible wing aircraft.

BACKGROUND

As a result of advances in electronics, unmanned aerial vehicles (UAVs) now come in a number of shapes, sizes, and configurations and have been used for a number of military and civilian applications including surveillance, combat, and cargo delivery. UAVs may fly under the direct or indirect control of ground operator personnel via radio or satellite link, either within the operator's line of sight or beyond the line of sight. The aircraft may be powered and directed by one or more rotors and be capable of vertical take-off and landing. Other UAVs may have fixed, rigid wings fitted with control surfaces to stay aloft and maneuver in conjunction with jet engines or propellers. These UAVs may have tails and rudders allowing for three-axis control, or may be rudderless and function on the basis of two-axis control. Various designs for UAVs are known in the art including flexible airfoil UAVs (WO 1610/100374A1). Various methods of controlling UAVs are also known in the art including methods for communicating with autonomous UAVs (US782316B2), modular UAV air delivery of packages (U.S. Pat. No. 9,348,333B1), UAV configuration for extended flight duration (US1616129998A1), among others.

UAVs under the direct control of a ground operator, whether within or beyond the line of sight, generally require computerized flight controllers that only need to be capable of translating inputs from the ground control console to appropriate movement of the aircraft's control surfaces to guide the aircraft along a desired flight path. A UAV that operates without the direct input of a ground operator requires a flight controller that can guide the aircraft autonomously to a predetermined destination, take into account obstacles, the condition and behavior of the aircraft and of environmental circumstances such as weather that may have an impact on aircraft performance and mission success, issue appropriate commands to mechanical, guidance and actuation systems, and accept confirmation of correct movement of actuation systems and of resulting flight path and aircraft behavior.

However, existing UAVs may not have the required flexibility to perform certain demanding missions or operations. There is a need for UAVs that are inexpensive to manufacture and to operate, and that can perform a wide variety of missions.

SUMMARY

We disclose herein a system and method for a UAV using a combination of sensors, electronics, mechanical controls, and payload systems adapted to a particular type of aircraft not previously used as an autonomous UAV.

More specifically, we disclose in this specification an aircraft comprising: a continuous wing assembly extending from port to starboard sides of the aircraft, the wing assembly comprising a wing body which is at least partly flexible whereby aircraft control is effected at least partially by flexing portions of the wing assembly; a fuselage attached to the wing assembly by a wing/fuselage joint structure configured to permit at least two mutually orthogonal axes of rotation of the fuselage relative to the wing structure, a control system for programming flight information and aircraft control instructions; and a plurality of actuators responsive to the control system for rotating the fuselage relative to the wing assembly about said two axes of rotation and flexing the wing assembly for controlling the flight of the aircraft in response to instructions from the control system.

We further disclose a method of autonomously controlling an aircraft, the aircraft comprising a flexible wing and a fuselage connected to the wing by a joint that permits rotation of the fuselage relative to the wing about two orthogonally opposed horizontal axes. In its broadest aspects, the method comprises:
 a) acquiring data from a plurality of sensors;
 b) transmitting said data to a controller;
 c) processing said data within the controller into aircraft control information; and
 d) transmitting said aircraft control information from the controller to aircraft control actuators that are responsive to said control information, wherein the actuators control the aircraft by one or more of them rotating the fuselage relative to the wing about at least one of the horizontal axes and/or by morphing or flexing the wing, wherein said rotation and wing flexure controls the aircraft flight.

In some embodiments, the method includes transmitting said sensor data and aircraft control information to ground personnel to track the aircraft, perform historical or maintenance related analyses, and/or override the controller in response to an external event.

Directional references herein, such as "vertical", "horizontal" and the like are used purely for convenience of description and are not intended to limit the scope of the invention, as it will be evident that the components described herein may be oriented in any direction. Furthermore, specific dimensions, materials, fabrication methods and the like are presented here merely by way of an example and are not intended to limit the scope of the invention.

BRIEF DESCRIPTIONS OF THE DRAWINGS

Embodiments will now be described by way of examples with reference to the accompanying drawings, in which like reference numerals may be used to indicate similar features, and in which:

FIG. 1 is a rear perspective view of one embodiment of an aircraft;

FIG. 6 shows a top and front perspective view respectively of the wing showing the wing flexibility;

FIG. 7 shows a top and back perspective view respectively of the wing showing the wing internal structure;

FIG. 12A is a side perspective view of an example wing tip actuator;

FIG. 12B is a perspective view of a the wing tip actuator of FIG. 12A;

FIG. 13A is perspective view of the wing tip actuator of FIG. 12A installed on a wing;

FIG. 13B is a perspective view of a wing tip actuator in accordance with an embodiment;

FIG. 13C is a perspective view of a wing tip actuator in a disassembled state in accordance with an embodiment;

FIG. 13D is a perspective view of the wing tip actuator of FIG. 13B in an assembled state;

FIG. 14 is a perspective view of an example wing trailing edge actuator;

FIG. 30 is a perspective view of an example axle actuator;

FIG. 31A is a perspective view of an engine and a portion of a frame of an embodiment of the aircraft;

FIG. 31B is a perspective view of the portion of the frame of FIG. 31A;

DETAILED DESCRIPTION

Definitions

Figure 2A:
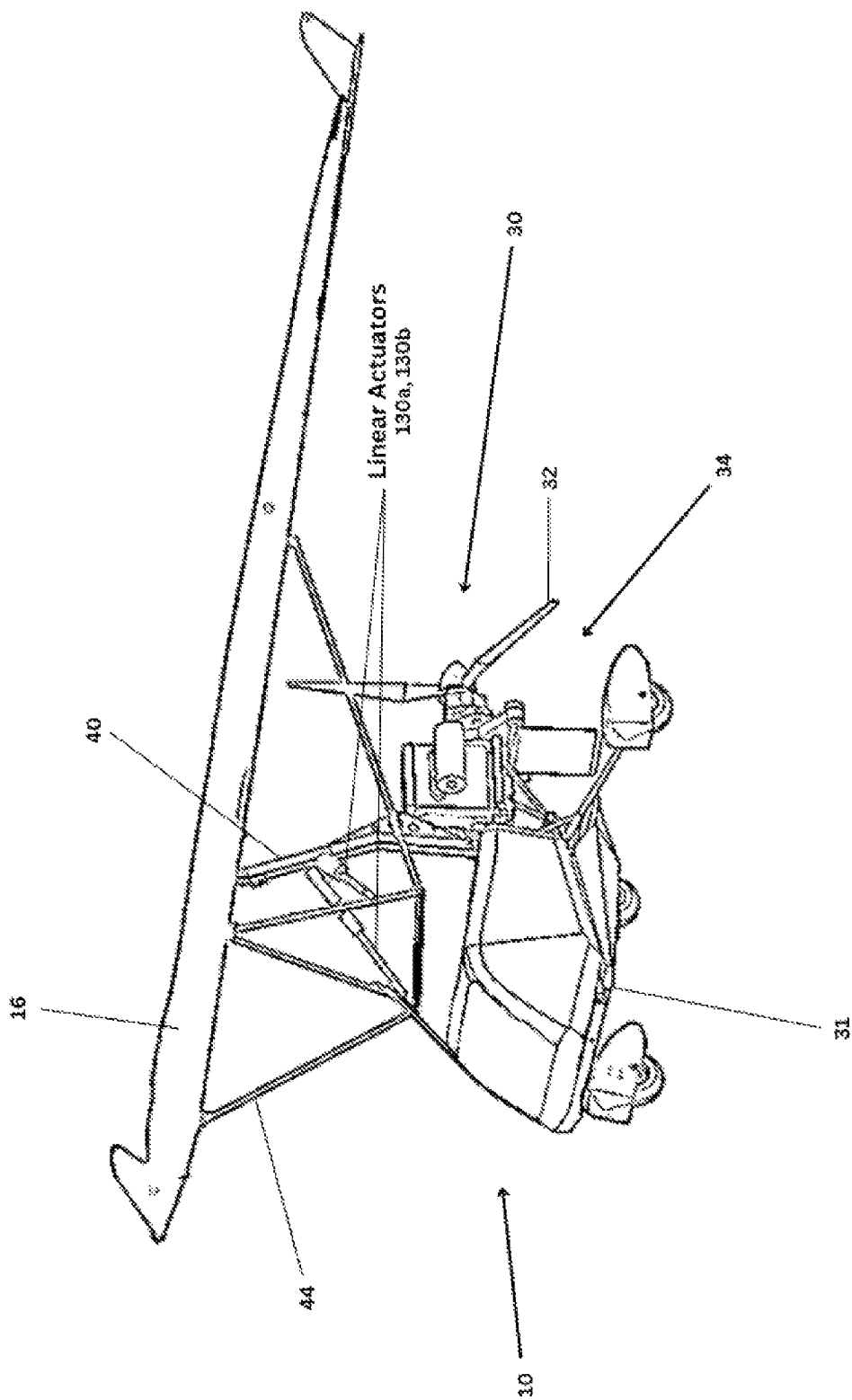
FIG. 2A is front perspective view of the aircraft of FIG. 1.

"Flex-Wing Aircraft" means: an aircraft having a wing that changes shape in response to certain flight conditions in ways that affect the aerodynamic control of the aircraft.

"Autonomous" means: capable of performing a scheduled and programmed mission under the direction of a computer with little or no human intervention during most or all of the mission; i.e., capable of perceiving, interpreting, and acting on information relevant to the completion of the scheduled mission.

"Semi-autonomous" means: capable of accepting and interpreting partial, minimal, or infrequent command inputs from human operators and interpreting these relatively simple inputs to control functions of the aircraft and successfully complete the mission according to parameters specified in advance. Such human interventions might be more frequent during certain portions of the mission when autonomy is more difficult.

"Weight shift control" means: a) an aircraft that can be maneuvered by shifting the aircraft's centre of mass left to right and vice-versa relative to the wing of the aircraft, which in turn causes the wing to deform flexibly and the lift characteristics of the port and starboard sides of the wing to change with respect to each other, thus maneuvering the aircraft; b) an aircraft that can be maneuvered by shifting the aircraft's centre of mass front to rear and vice-versa relative to the wing of the aircraft, which in turn causes the aircraft to pitch upward or downward, thus maneuvering the aircraft; and c) any combination of a) and b).

FIG. 1 depicts an aircraft 10 according to one embodiment. Aircraft 10 comprises a fuselage 8 which is suspended from a wing assembly 6. Wing assembly 6 comprises a continuous wing 16 (shown in more detail in FIGS. 3 to 7) composed of a central wing region 18 and port and starboard wing tip regions 24 and 26. Central wing region 18 comprises approximately the central third of wing 16, with tip regions 24 and 26 likewise each constituting about one third of the span of wing 16. Wing 16 can include upwardly-extending winglets 22a and b at opposing ends, extending upwardly from wing tip regions 24 and 26. Fuselage 8 is secured to wing assembly 6 via a mounting frame 30 whereby fuselage 8 is mounted in the middle of wing assembly 6 with port and starboard regions of wing 16 extending outwardly from the port and starboard sides of fuselage 8. As discussed further below, mounting frame 30 permits rotational movement of fuselage 8 relative to wing 16 about two orthogonally-opposed, horizontal axes of rotation.

For reference, FIG. 1 conceptually shows the following axes: axis X extends horizontally in a transverse direction between wingtips 24 and 26; axis Y extends horizontally in a longitudinal direction from along the fore/aft axis of the aircraft, and axis Z is a central vertical axis which intersects axes X and Y. Aircraft 10 further includes a push-type propeller 32, driven by an engine 34 which may be a conventional aircraft or automotive engine, or an electric engine. A wheel assembly 36 extends downwardly from fuselage 8 to provide landing gear for aircraft 10. In the embodiment shown in FIG. 1, the engine 34 is located in the rear of the aircraft 10. However, in some embodiments, the position of the engine 34 may be reversed such that the engine 34 is located at the front of aircraft 10 and propeller 32 is a tractor-type propeller, with two wheels 36 for landing gear at the front and one at the rear of aircraft 10. In such an embodiment, the frame mast 96 (see FIG. 9) is directly behind the engine 34 and the cargo container bay or pod 38 is behind the mast 96.

Fuselage 8 carries a cargo bay or pod 38, which may be integrated with fuselage 8 or detachable, for example using bolts, clamps or other means for securing it in place and detaching it. The underside of the pod 38 may incorporate slots into which forklift arms or other mechanical arms may be inserted, allowing the removal of the pod by machine-assisted or automated methods. Similarly, the fuselage frame members 31 (seen in FIG. 2A) immediately underneath the pod 38 may incorporate depressed sections such that a forklift can slide under the pod 38 and thus mechanically disengage pod 38 from aircraft 10.

Figure 25:
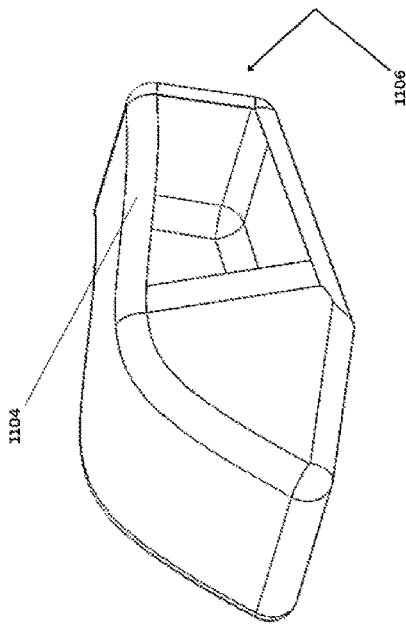
FIG. 25 is a perspective view of the cargo bay of the aircraft of FIG. 24.

The cargo pod 38 typically incorporates either removable panel(s) (for example, on the sides or top), or a hinged door to allow access to any cargo carried inside the pod 38 (shown more clearly in FIG. 25).

Figure 2B:
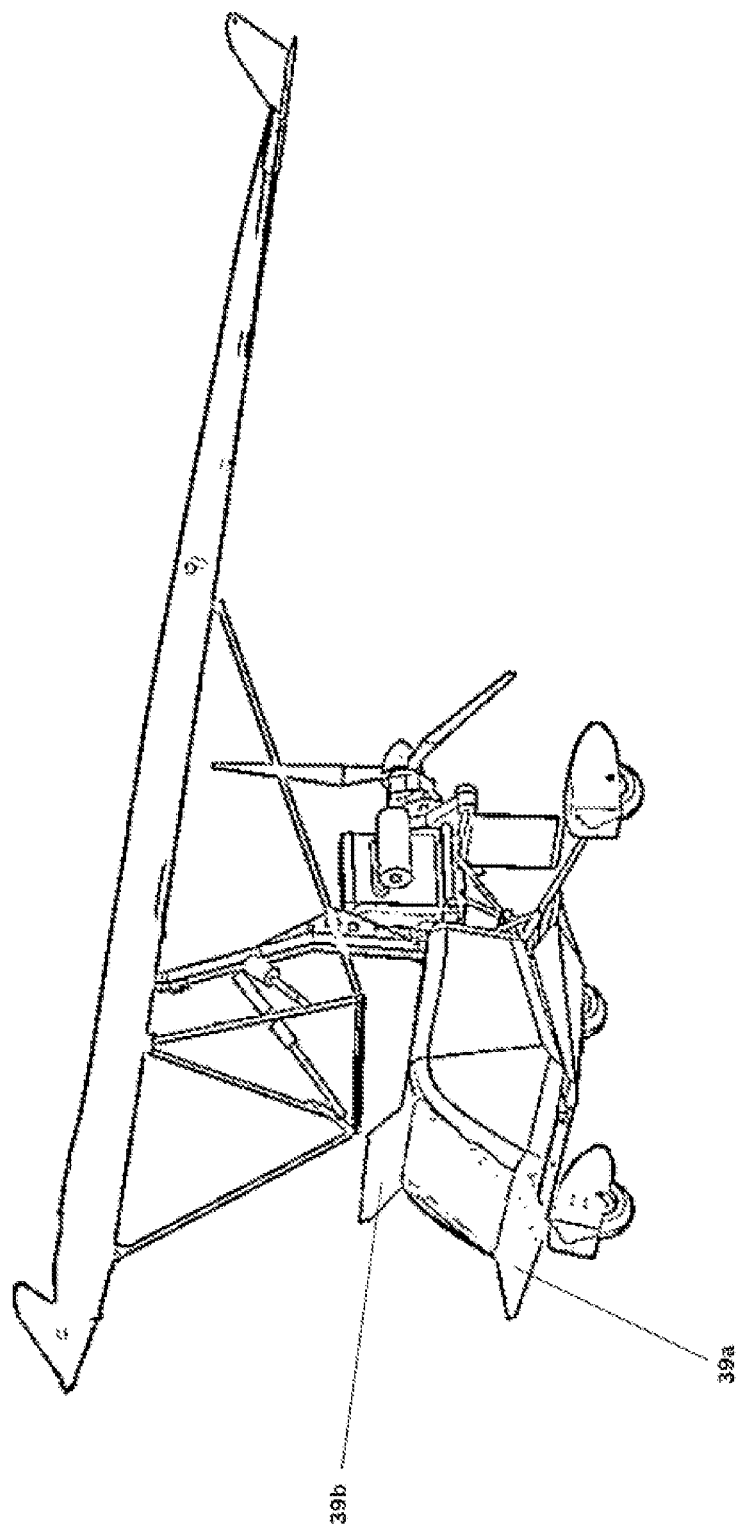
FIG. 2B is a front perspective view of the aircraft of FIG. 1 with the cargo bay in an open position.
Figure 3:
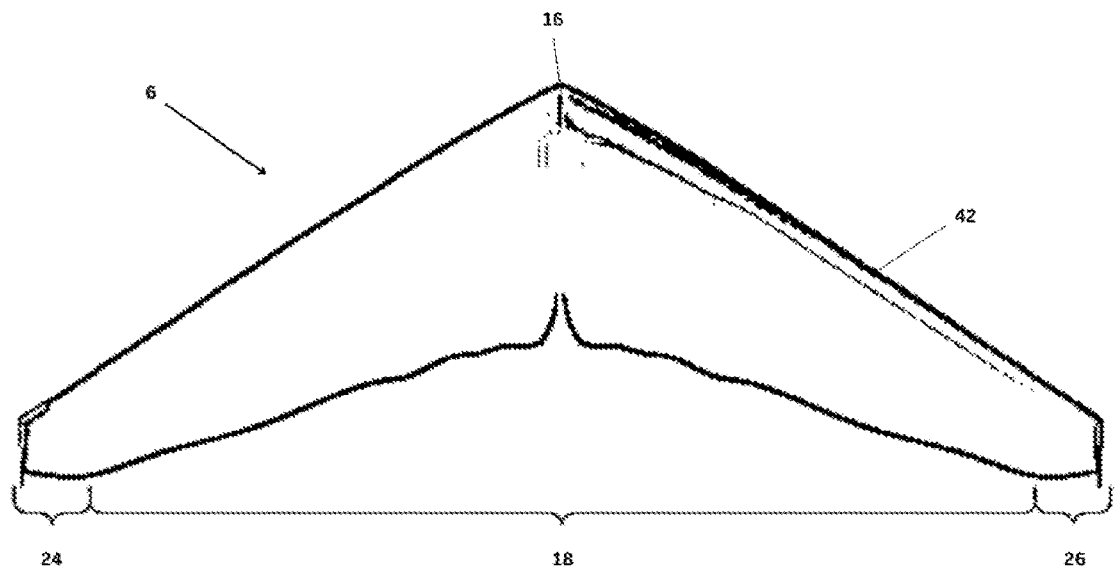
FIG. 3 is a top perspective view of an aircraft wing according to the first embodiment.
Figure 9:
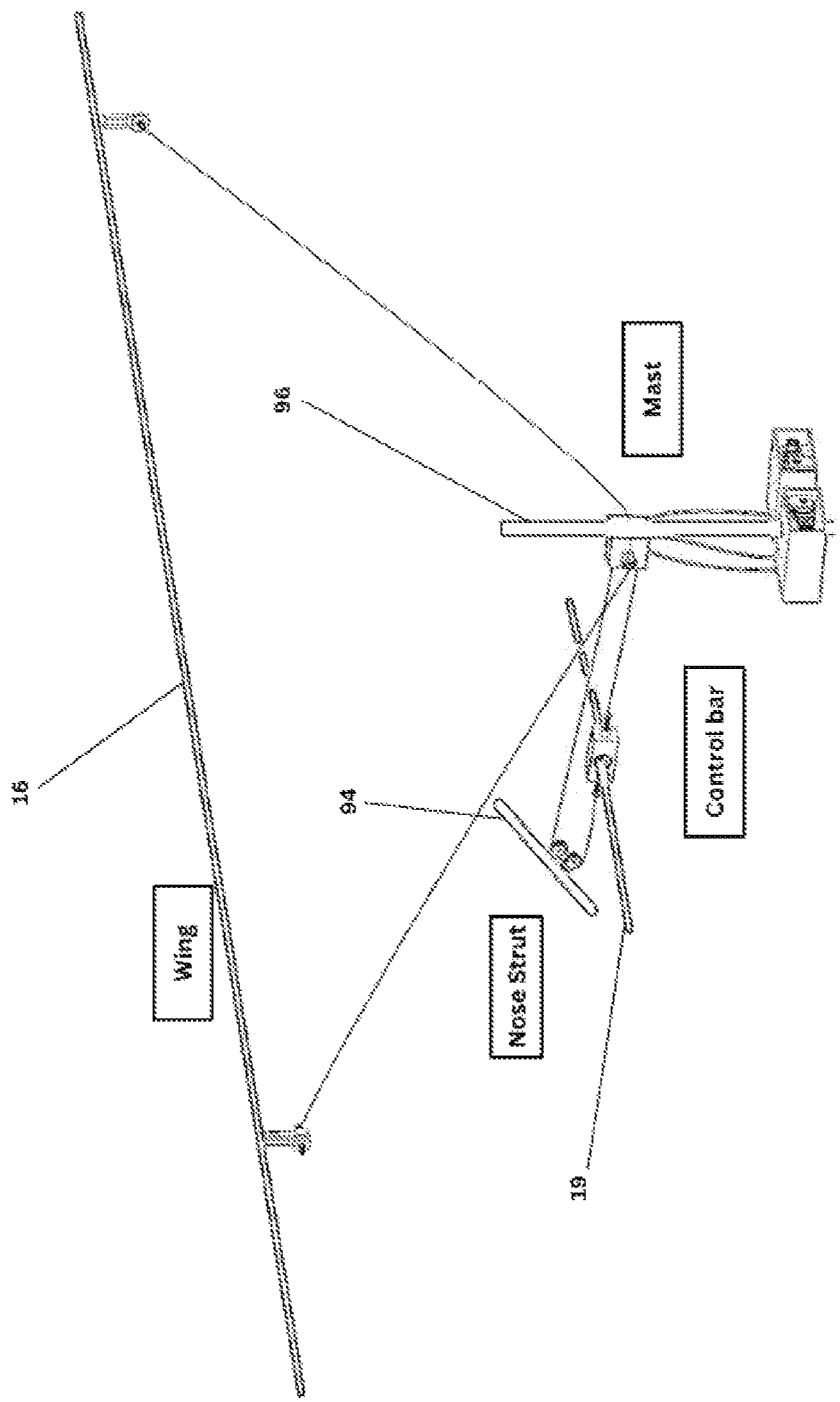
FIG. 9 is a side perspective view of the fuselage rotation actuation system.

The front of the cargo pod 38 in the pusher-type propeller configuration of the aircraft 10, as shown in FIG. 2B, may incorporate one or more upward and/or downward swinging doors, for example, doors 39a, 39b that can open all or a portion of the front of the pod 38. This allows the aircraft 10 to overtake and capture airborne objects while both the aircraft 10 and the object(s) are in flight. For example, the aircraft 10 may capture other aircraft, including UAVs that are small enough to fit inside the pod 38, such as smaller electrically powered UAVs intended to deliver small parcels. Such operations may require that the aircraft having the cargo pod reduce its airspeed and disengage its propeller or temporarily disable its engine, which is possible as this type of weight-shift control, flex-wing aircraft is known to have a typically high glide ratio and good handling characteristics at low air speeds. In this embodiment of aircraft 10, the fuselage frame 30 will not include a nose strut, for example nose strut 94 running from the forward most part of the frame 30 to the upper part of the mast 94 (as shown in FIG. 9). In such embodiments, reinforcement of the frame 30, especially where the mast 96 meets the underside of the frame 30, can compensate for the absence of the nose strut 94 as is known in the art and may be used for example for ultralight aircraft.

In embodiments where the aircraft 10 is of a tractor-type propeller configuration, the rear of the pod 38 may incorporate an upward or downward swinging door that can open the entire rear or most of the rear of the pod 38. This allows other airborne objects behind the aircraft 10 to fly into the pod 38 while both the aircraft 10 and the object are in flight. For example, the aircraft 10 may accept other UAVs that are small enough to be contained within pod 38. In other embodiments, the cargo pod 38 may open from either side or from the bottom to accept incoming objects or to launch such objects.

As described above, this can enable the aircraft 10 to carry cargo such as packages that are affixed to smaller aircraft such as UAVs. These aircraft can be carried together inside the cargo pod 38 and launched to other locations within a given range of the flight path of aircraft 10. Smaller UAVs can return to the larger aircraft 10 while it is airborne to retrieve other packages and repeat the process at appropriate junctures according to a programmed delivery scheme. In this fashion, the effective range of the aircraft 10 can be extended by the ranges of the smaller UAVs, deliveries can be made more efficiently without diverting or landing aircraft 10 which may be carrying multiple packages, and flexibility can be achieved in the delivery route by the ability of the smaller UAVs to land and take-off vertically within busy urban or other environments that might not be accessible to aircraft 10 which may not have vertical take-off and landing capabilities.

In some embodiments, pod 38 may contain elements such as netting to arrest the moving objects received into the pod during flight, and a mechanical, robotic package feeding system to convey specific packages to a specific location within the pod 38 in a given sequence according to a programmed scheme, to allow these packages to be sent out in sequence while aircraft 10 is airborne over corresponding portions of its route where the packages are to be delivered. The pod 38 may also contain a robotic arm that can attach to UAVs inside pod 38 and the robotic arms can be used to position the UAVs to accept packages ready for delivery.

FIGS. 3 to 7 illustrate wing assembly 6 in detail. Wing Assembly 6 includes wing 16, which has a swept-back shape and is flexible along its port-starboard length within a vertical plane. Wing 16 is also flexible horizontally to permit wing 16 to twist about horizontal axis X. The flexibility of wing 16 permits its configuration to be actively altered in response to urging from actuators, described below which cause wing 16 to depart in various respects from a neutral, "rest," or "trim" position, seen in FIG. 3, in response to both aerodynamic and mechanical forces applied to it. According to this aspect, the flexibility of wing 16 may vary at different locations of the wing to optimize aerodynamic effects.

Figure 4:
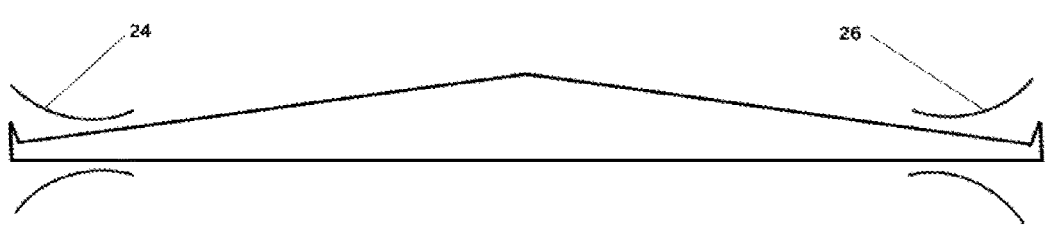
FIG. 4 is a front perspective view of the wing showing the port and starboard flexibility of an outer wing.
Figure 5:
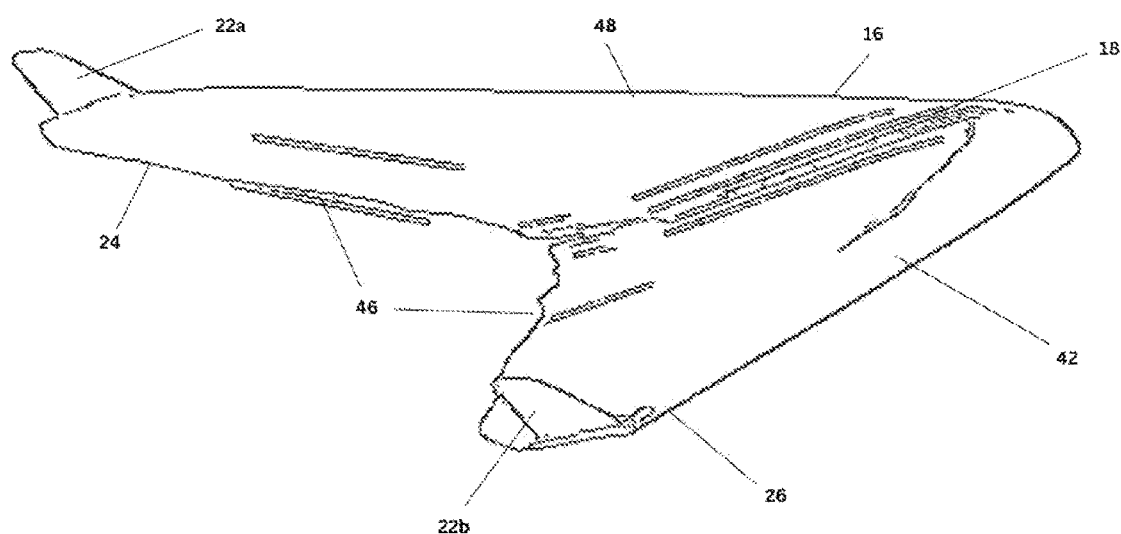
FIG. 5 is a side perspective view of the wing showing the trailing edge flexibility of the wing body.

Referring to FIG. 7, wing 16 comprises a skeleton 40 composed of aluminum tubing covered by a fabric cover 42. Wing skeleton 40 comprises tubing 41 which defines the leading edge of wing 16, and a keel 43 which defines the centre structure of wing 16 from front to rear. Tubing 41 consists of a semi-rigid segmented tube, which provides sufficient rigidity to substantially maintain the wing shape during flight, but which can also flex especially in the outermost regions in response to actuation from wing actuators (described further below). Furthermore, tubing 41 has sufficient flexibility to flex in response to air pressure and drag during flight, in a controlled and limited fashion. During flight, tubing 41 flexes rearwardly at high speeds, such that wing 16 increases its sweep angle. Wing skeleton 40 further comprises an array of semi-rigid battens 44, which run from the tubing 41 to the trailing edge of wing 16 and define the cross-sectional wing-shaped profile of wing 16. Fabric cover 42 (see FIG. 3) is stretched over battens 44 and tubing 41 to provide the wing-shaped configuration. Wing tip regions 24 and 26 are able to flex vertically (see FIG. 4) and the rear centre and rear outer areas of the wing 16 may billow in response to shifts in the centre of gravity of aircraft 10, in turn permitting maneuvering of aircraft 10. In one aspect, the portion of tubing 41 at central wing region 18 is relatively rigid, with wing tip regions 24 and 26 being more flexible, as seen in FIGS. 4 and 6. In this embodiment, wing tip regions 24 and 26 can flex upwardly or downwardly by an V and forward and backward by angle X (as seen in FIG. 6), whilst central region 18 remains substantially rigid. As seen in FIG. 5, wing 16 may also comprise a relatively flexible trailing edge region 46 that may deform or billow during flight, in comparison with a leading region 48 that is relatively rigid.

Figure 15:
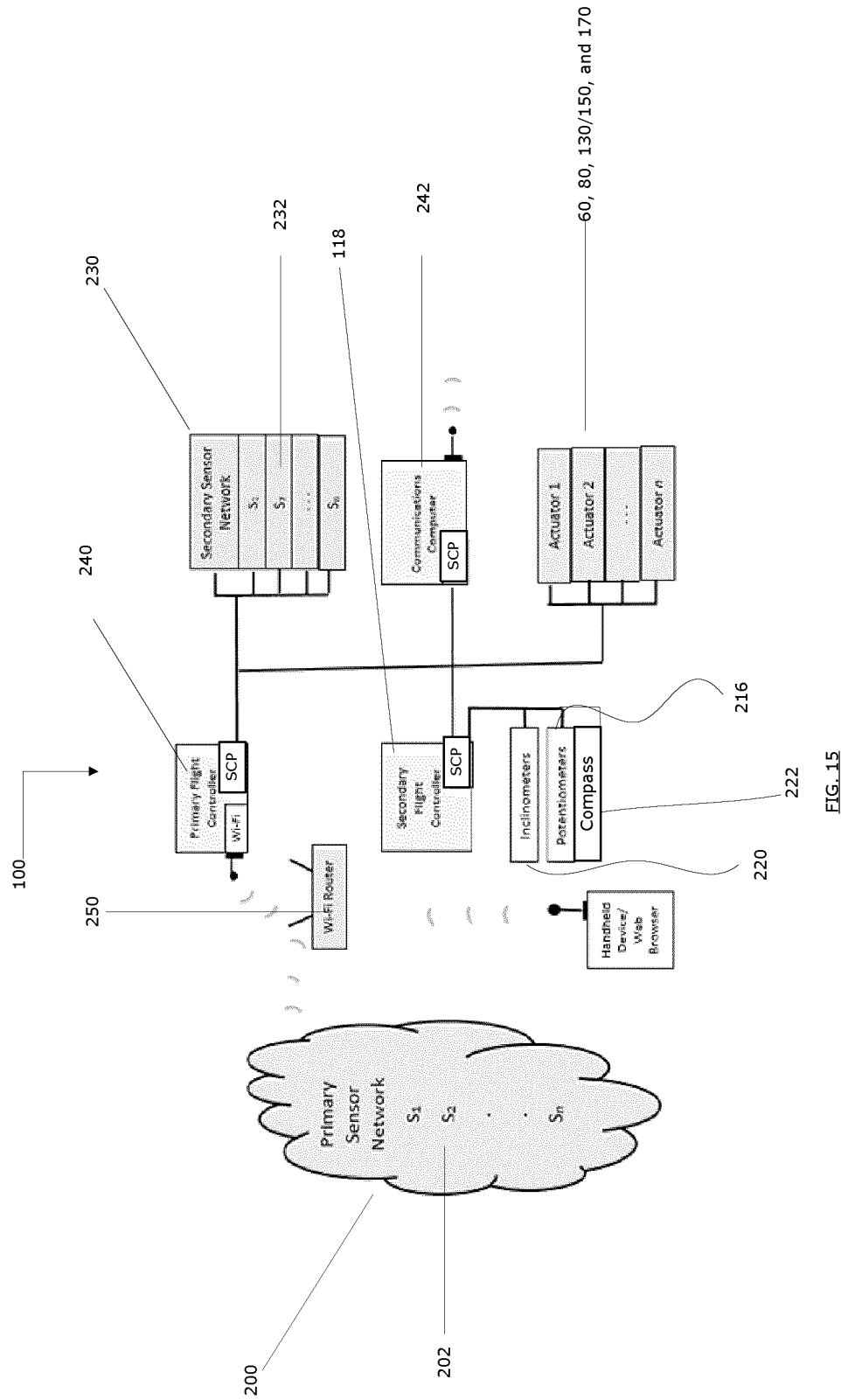
FIG. 15 is a schematic view of a UAV flight control system according to a first embodiment.

Winglets 22a and b are each mounted to wing body 16 and each one may include internal joint(s) that permits the winglets 22a, 22b to fold downward from the upright 90 degree position to effectively extend the length of the wing. This is known as an adaptable winglet and its movement or adaptability is known to affect the lift characteristics of the end of the wing when the winglet is so unfolded, and may in turn cause the aircraft to bank and maneuver. There exists prior art on adaptable winglets such as US 2013/0099060A1, however such designs have never been applied to flex-wing, weight shift control aircraft whether manned or unmanned. As discussed below, winglets 22a and b are each actuated by a rotary actuator 60 that is responsive to a primary flight controller 240 (FIG. 15).

Tubing 41 comprises a central tube 54 and end tubes 56a and 56b that fit within the opposing open ends of central tube 54 in a tube-in-tube arrangement whereby end tubes 56 can freely rotate within central tube 54 within a given, limited range (see FIG. 12B). Rotation of end tubes 56 causes wing tips 24 and 26 to be independently twisted about horizontal transverse axis X. Rotation of end tubes 56, and thus twisting of wing tips 24/26, is actuated by means of wing tip actuators 60, two types of which are shown in FIGS. 12A and 12B and 13A to 13C, located on opposing ends of wing 16. The twisting motion of one of wing tips 24/26 is shown schematically in FIG. 13A. The rotation of this section of a wing tip 24/26, shown more clearly in FIG. 13A, is translated into a flexing of wing 16, which in turn maneuvers the aircraft 10.

Each actuator 60 typically includes a standard type encoder (not shown) for position feedback monitoring, which is electronically linked to primary flight controller 240. Actuator 60 comprises a piston housing 62 housed within central portion 54 of tubing 41, and which in turn houses a piston 64 driven by an electric motor which may be a part of piston 64. The distal end 66 of piston 64 has helical threading and is received within a corresponding one of end tubes 56. The inside surface of end tubes 56 in turn comprises a mating thread that engages the threading of distal end 66 of piston 64. Linear movement of piston 64 is thereby converted into rotational movement of the end portion of actuator 60 as the mating threads engage, thereby generating a twisting motion of a corresponding one of wing tips 24/26. When not powered or activated, this design of actuator tends to stay in a fixed position thus keeping the wing tips 24/26 from twisting under aerodynamic forces.

Wing tip actuator 60 shown in FIGS. 12A and 12B consists of an electric motor of piston 64 that drives a flat, twisted bar 67 in and out. The twisted portion runs through a slot 61 inside the end tube section of tube 41 of the wing 16 and causes this end section to rotate.

In another embodiment, wing tip actuator 50 shown in FIG. 13B consists of an electric motor 51 situated outside of, and fastened to, the main tube 41 of the wing 16. The motor turns a belt drive 53 that causes the end section of the wing tube 41 to rotate.

In another embodiment, shown in FIG. 13C the electric motor 51 is sized to fit inside a housing 52 that is disposed inside the larger, fixed section of the wing tube 41 and mates through a sprocket fitting 55 with the smaller section 54 of the actuator that fits inside the smaller, end section of the wing tube that rotates. The rotation of the motor 51 causes the end tube to rotate with respect to the main wing section. In both embodiments, a short baton 57 may be fastened to the outer, rotating section of the wing tube 41 in order to accentuate and assist the rotation of the wing tip area fabric and facilitate up and down movement of the end of the wing 16. FIG. 13D shows an example of the actuator 50 when the large section 52 and small section 54 are mated together.

The primary flight controller 240, described further below, issues commands to the winglet servos or wing tip actuators 60 in response to signals from primary sensor network 200. Such signals are, in turn generated by controller 240 in response to sensor data that controller 240 has interpreted to mean that the aircraft 10 is deviating from a programmed or predetermined heading, or that will soon cause deviation from such heading based on the relative position in space of the fuselage 8 with respect to the wing 16, or based on the shape of the wing 16 at a particular moment in time.

Winglets 22a and b or wing tip actuators 60 are fitted with an encoder (not shown) to provide position feedback readings to controller 240. The movement of the fins of the winglets 22a and b in response to the commands from controller 240 can cause one or both wing tips 24 or 26 to drop or to rise while the aircraft 10 is in flight, or cause the entire wing to yaw to either port or starboard, resulting in a change of direction of the aircraft 10.

Partially flexible wings comprising tubing, keel, battens, and fabric such as wing 16 are known to suffer irregular wear, and different wing units may therefore not be perfectly identical to each other. Such wing units are also difficult to manufacture in a perfectly standardized manner and therefore may not be perfectly identical to each other even when new at the point of manufacture. The winglets 22a and b or wing tip actuators 60 may be adjusted and calibrated with the individual and unique wings 16 in which they are installed during test flights or periodically to cause each wing 16 to behave in a more typical or standardized fashion. This can ease the computational burden on the aircraft flight controller 240 as fewer in-flight compensations will be needed to address wing 16 and aerodynamic irregularities that affect maneuvering at various speeds and under various conditions.

Referring to FIG. 14, wing assembly 6 further may optionally be provided with wing body actuators 80 to independently rotate port and starboard portions of wing 16 about horizontal transverse axis X, especially at the outer-mid trailing edge areas. This rotation functionally emulates the action of conventional wing flaps to provide directional control or stability of aircraft 10. Separate actuators 80 are provided on the respective port and starboard areas of wing 16 to independently rotate the port and starboard portions of wing 16. Actuators 80 each comprise a high-torque, low speed motor 82 and an encoder or position feedback monitor electronically linked to control system 100. Actuators 80 are fastened to a section of tube 41 with a bracket 84. Actuators 80 further comprise a reaction arm 86, a proximal end of which is mounted to the shaft 88 of motor 82. Arm 86 is secured to and extends substantially the length of one of the battens 44, whereby rotation of arm 86 about axis X causes the corresponding batten 44 to rotate about the same axis X. Actuators 80 alter the shape of wing 16 by raising or lowering portions of the trailing edge of wing 16, in turn causing the port or starboard sides of wing 16, or both, to move up or down when the aircraft 10 is in flight. Controller 240 issues commands to actuators 80 in response to data from the primary sensor network 200 that the computer of controller 240 has interpreted to mean that the aircraft 10 is deviating from a programmed or predetermined heading, or that it will soon deviate from such heading based on the relative position in space of the fuselage 8 with respect to the wing 16, or based on the shape of the wing 16 at a particular moment in time, or based on other data as described herein.

Figure 8:
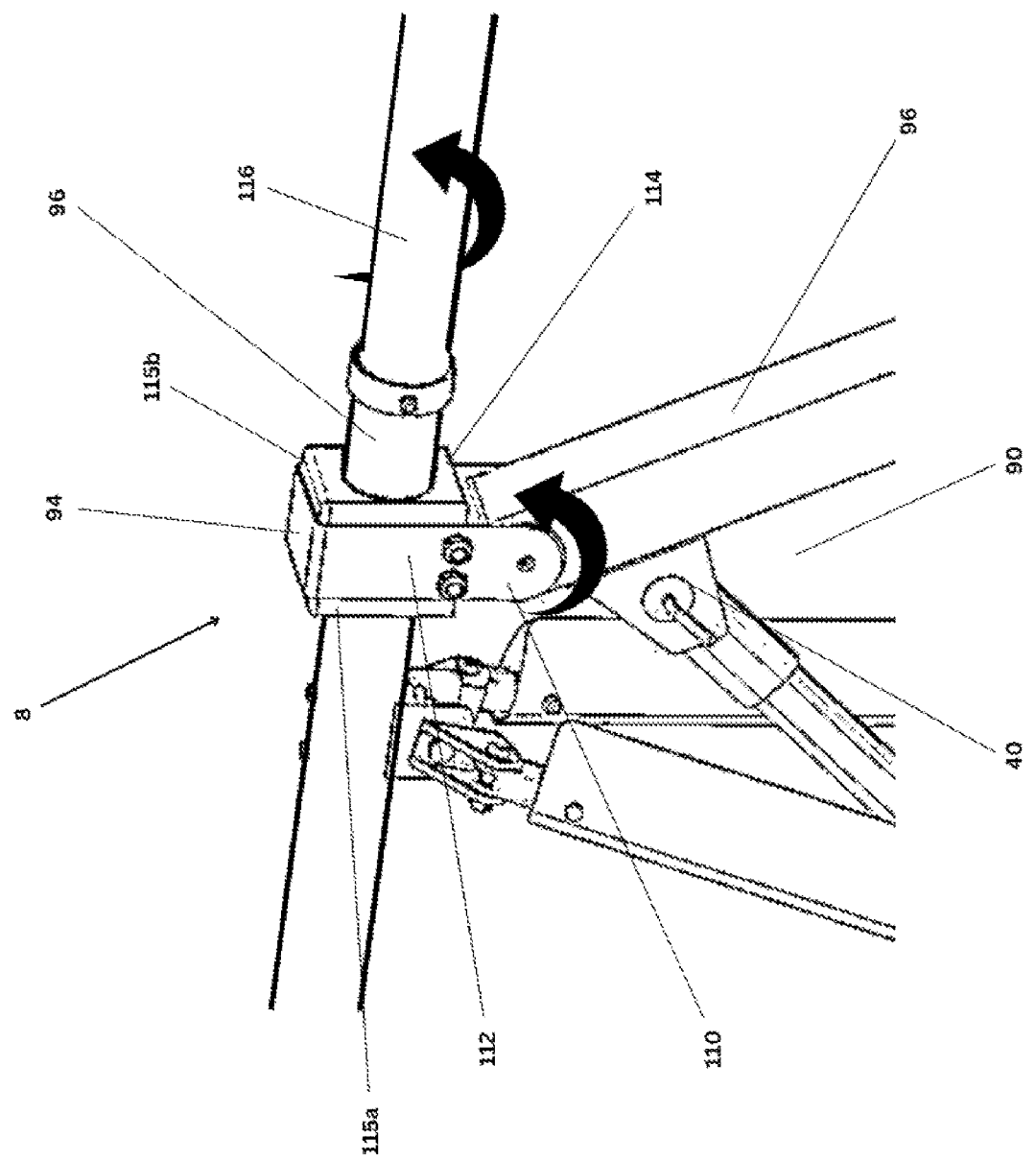
FIG. 8 is a perspective view of the fuselage joint assembly.
Figure 10:
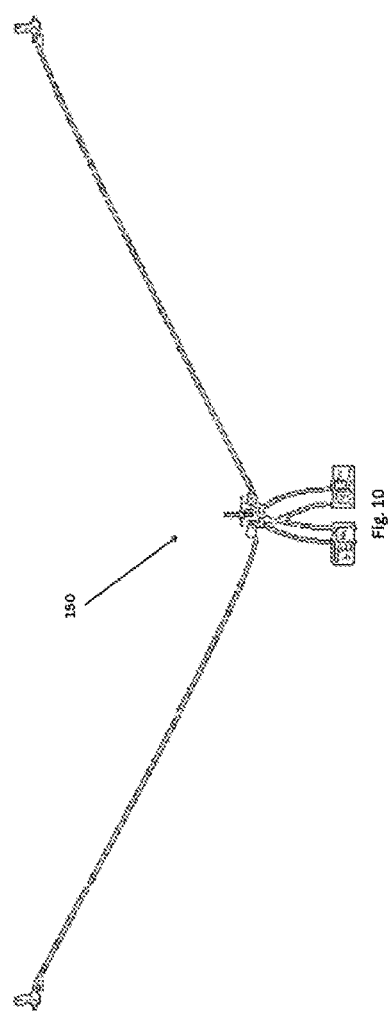
FIG. 10 is a front perspective view of the fuselage rotation actuation system of FIG. 9.

Referring to FIGS. 1 and 8, fuselage 8 comprises an open frame of rigid structural members, including an undercarriage 90, a motor mounting platform 92, a nose strut 94 and upstanding mast 96 that is located immediately aft of motor platform 92. Nose strut 94 and mast 96 support the wing assembly 6, as seen in FIGS. 9 and 10. Nose strut 94 joins mast 96 at their respective upper ends to provide additional support to mast 96 and provide additional structural integrity. Wing assembly 6 in turn comprises a skeleton 40 composed of aluminum tubes that may include tube 41 protruding downwardly from wing 16, that support wing 16.

As seen in FIG. 8, mast 96 is connected to wing assembly 6 through a two-axis joint 110. The first such degree of freedom permitted by joint 110 permits fuselage 8 to rotate about horizontal, transverse axis X to adjust the pitch of fuselage 8 relative to wing assembly 6. The second degree of freedom permits rotation of fuselage 8 about longitudinal horizontal axis Y to permit roll of fuselage 8 relative to wing assembly 6. Joint 110 comprises a solid block 112 having a transverse aperture 114 aligned with axis X. Aperture 114 rotatably receives a wing keel tube 116 of wing assembly 6, which in turn is aligned with axis Y and extends in a fore-aft direction. Rotation of tube 116 within aperture 114 tilts the wing about axis Y, to thereby adjust the yaw (port/starboard tilt) of wing assembly 6 relative to fuselage 8. Joint 110 further comprises a pair of plates 115a, 115b which sandwich block 112 and are bolted thereto. The upper end of mast 96 is mounted to joint 110 with a shaft that extends between plates 115a, 115b and which passes through a corresponding aperture in mast 96. This permits rotation of joint 110 about axis X to adjust the fore/aft pitch of fuselage 8 relative to wing assembly 6. Joint 110 thus permits wing 8 to tilt up or down about axis X relative to fuselage 8, and also side to side about axis Y.

Referring back to FIG. 2A, the aircraft 10 may be controlled by means of two linear actuators 130a and b. These linear actuators 130 may comprise a leadscrew design in which an electric motor rotates a screw to drive it in and out of a piston housing, or to move the screw forward and backward, or if the screw is held stationary then to move the motor back and forth. They may alternatively comprise hydraulic or pneumatic piston design. The linear actuators 130 are attached at one end to mast 96 and at their other ends to wing undercarriage 90. Actuators 130 splay outwardly from mast 96 whereby the piston ends are spaced apart to form two legs of a triangle with undercarriage 90. As such, independent actuation of actuators 130 causes wing assembly 6 to either tilt laterally along axis Y or, if actuators 130 move in a coordinated motion, for wing assembly to tilt in a fore/aft direction around axis X. Actuators 130 can also cause complex movement of wing assembly 6 about both of axes X and Y. Software embedded within one or more control systems (for example control system 100) of actuators 130 comprising a kinematic model mapping the total set of all possible combined actuator positions relative to each other and to the wing assembly may be used to enable such complex movement. Actuators 130 thus control aircraft 10 by tilting wing assembly 6 in a desired direction, thereby controlling the direction of travel of aircraft 10, its angle of incline or decline, etc.

Linear actuators, for example actuators 130 driven by electric motors (which may be disposed within actuators 130) include motor controller units that permit release or back-driving of the motors in response to external forces (for example, a push or a pull) applied to them. The external forces are mechanically transmitted for example through the wing and its supporting structure during certain flight conditions, for example when the wing is buffeted by winds or gusts. The mechanical design of the linear actuators 130 may also incorporate features such as glide screws or ball screws that permit back-driving as would be understood in the art, to work in tandem with the software and electric motors. Software in the motor controller units contains rules to govern the use of the electric motors in such a manner, and to accept commands from the flight control system 100 of the aircraft, or generally instruct the activation of the actuator motors with various levels of intensity or electric current in response to conditions interpreted and calculated by the flight controller 240 of control system 100 based on data received from sensors 202, 232. In this manner the motor control units of the linear actuators 130 can be integrated with control system 100 of aircraft 10.

The ends of the actuators may also be fitted with vibration isolation mounts, bobbins, rubber or other material to reduce the extent of mechanical forces transmitted to the actuators and allow limited play in the movement of the wing without excessive effect on the actuators or frame of the UAV. For similar purposes, the leadscrew of actuator 130 may be fitted with a torque limiting device that allows the leadscrew to be driven inward or pulled outward even when the electric motor is set to hold the actuator 130 in a fixed position. Thus, a possible malfunction in the software that prevents over-stress of the actuator 130, frame 30 or wing 16 of aircraft 10 can be compensated for by mechanical means of one or more of these components. The software and torque limiting device thus comprise redundant and compatible systems using contrasting mechanical and electronics means. As a result, an electronic failure of actuator 130, for example, will not result in inoperable actuators that would in turn over-stress the frame 30 of aircraft 10 and/or act against one or more of actuators 60, 80, or 150 that would be engaged to compensate for any such failures.

Actuators 130 are responsive to flight control system 100, which in turn receives data from sensors such as sensors 202. As described below, sensors 202 can detect whether aircraft 10 is deviating from a programmed or predetermined heading or altitude, or that it will soon deviate from such heading based on the relative position in space of the fuselage 8 with respect to the wing, or based on the shape of the wing 16 at a particular moment in time, or based on other data. The activation of actuators 130 is based on algorithms or mathematical models residing in control system 100 and causes the extension or retraction of one or both of actuators 130 in appropriate combination by a specified amount that causes wing 16 to pitch up or down, or to roll either port or starboard, or any combination thereof, and so cause a course heading correction.

Figure 11:
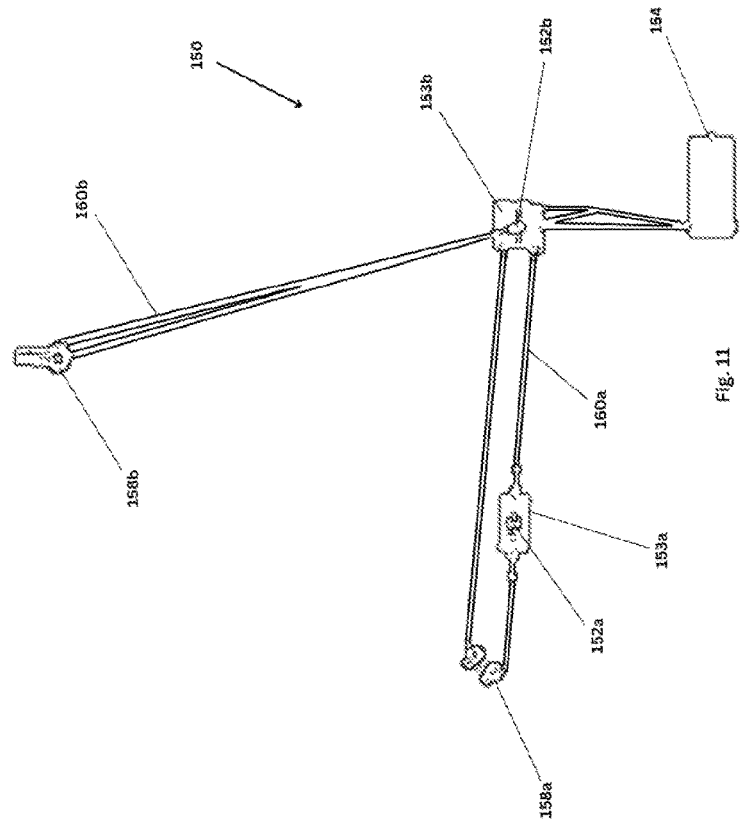
FIG. 11 is a side perspective view of the fuselage rotation actuation system of FIG. 9.

FIGS. 9 to 11 depict an alternative embodiment of actuators 150 for rotating fuselage 8 relative to wing assembly 6 about axes X and Y. According to this embodiment, actuators 150 (shown in detail in FIG. 11) each comprise a pair of electrical motors 152a and b, supported on a base 154. The output shafts of motors 152 are connected to corresponding cable reels 158a, 158b. Cable reels 158a, 158b in turn wind and unwind respective cables 160a and b. The electric motors 152 may drive the reels 158 through torque limiting devices so that excessive forces opposing the movement of the reels, for example a powerful gust of wind, can back drive the reels and so prevent over-stress or damage to the aircraft frame 30 or reel and cable system 150. The cables 160 may also be elastic or inelastic (static), or may be a combination of elastic and static segments. For example, cables 160 may comprise an inner segment that is static and an outer segment that is elastic. The elastic portion can act as a shock absorber to allow a minimum amount of movement of the wing 16 relative to the fuselage 8 given routine air turbulence and flight disturbances and the need to prevent overstressing of the mechanical systems of aircraft 10. Alternatively, respective cables 160a, 160b may fasten to a rigid box 153a, 153b fitted with a bobbin or shock absorbing material (located within the boxes 153), terminate on one side of the respective box 153, and new cable sections continue from the other side of the box 153 which may also have a bobbin at the point where the cable 160 is fastened. Cables 160 are wound up on the respective reels 158 at their middle regions whereby two portions of cables 160 unwind from reels 158 simultaneously. Cables 160 are wound up on reels 158 whereby rotation of a given reel 158 in a first direction causes a first portion of cable 160 to be unwound and second portion to be retracted by an equal amount. In this fashion, cables 160 can generate equal and opposite retractive (tensioning) and de-tensioning forces on wing assembly 6.

The free ends of cables 160a and b are anchored to wing assembly 6. First cable 160a is secured to wing tips 24 and 26, whereby tensioning and de-tensioning the respective portions of cable 160a causes wing assembly 6 to tilt about axis Y in the port/starboard direction. Second cable 160b is secured to central wing assembly keel 116 adjacent to opposing ends thereof. Tensioning and de-tensioning of the respective ends of cable 160b thus actuates tilt of wing assembly 6 in the fore/aft direction to adjust wing pitch.

The operation of motors 152 is responsive to signals from flight control system 100, which transmits operational control signals to motors 152 to control the roll or side-to-side movement of aircraft 10 (as shown in FIG. 10) and control the pitch or up and down movement of aircraft 10 (as shown in FIG. 11). Control system 100 is configured to issue operational commands to motors 152 in response to data from the primary sensor network 200. As discussed above, such data is interpreted by control system 100 to detect whether the aircraft is deviating from a programmed or predetermined heading or altitude, or that it will soon deviate from such heading based on the relative position in space of the fuselage 8 with respect to the wing, or based on the shape of the wing 16 at a particular moment in time, or based on other data. The activation of motors 152 selectively tensions or de-tensions cables 160a and b such that the fuselage 8 alters its position with respect to the wing 16 within either or both of its axes of rotation. Such rotations of fuselage 8 with respect to wing 16 cause the aircraft centre of mass to shift and the aircraft to change direction and/or altitude.

FIG. 30 depicts an example axle strut actuator 170 that may be affixed to a rear landing gear strut in the pusher-type propeller UAV configuration, or to a forward landing gear strut in the tractor-type propeller UAV configuration. One such actuator 170 is attached to each strut to form a pair of actuators, either at the front or rear of the UAV depending on the configuration. Each actuator 170 consists of an airfoil that surrounds the tubular landing gear structure (strut) that holds the wheels in place. The strut runs through the airfoil in the direction of line 171 and is secured in two or three locations. An electric motor 173 is inside each airfoil, and by electronic activation of the motor 173, a belt 174 drives the rotation of the airfoil 172 about the tubular structure. A downward movement of the airfoil 172 in the air stream while the UAV is flying will exert an upward force on the landing gear of one side, and vice-versa. Such movements may be paired with opposite movement of the other actuator. This causes either the port or starboard side of the fuselage 8 to lift upward, and the opposite side to push downward, in turn changing the position of the centre of mass below the wing 16 and inducing a maneuver similar to the way the motor reel actuators 150 may accomplish the same task.

FIGS. 15 to 22 depict the operation of control system 100, which is configured to control the operation of aircraft 10 in an autonomous or semiautonomous fashion. Control system 100 responds to data from multiple sensors which are mounted throughout aircraft 10 in various selected locations, depending on their functions. Suitable sensor locations include wing 16, winglets 22a and b, engine 34, and various locations in fuselage 8.

The sensors of aircraft 10 are grouped in primary and secondary sensor networks that comprise one or more sensors that may be in communication with each other. The primary sensor network 200 is comprised of a plurality of sensors 202 that detect parameters relating to aircraft position and movement and environmental conditions that directly affect these parameters. The primary sensor network 200 typically includes sensors 202 such as global positioning (GPS) sensors, and sensors that detect inertial movement including accelerometers, gyroscopes, and magnetometers and may also include sensors to detect air temperature, humidity, wind speed, direction of movement and other environmental or structural parameters and conditions.

Each primary sensor unit 202 is connected to one or more power sources 209 such as batteries, processing devices 210, for example a high-performance microprocessor 211, communication devices such as Wi-Fi capable transceivers 212 or serial communications port (SCP) devices 213, and recording devices 214 such as a secure digital card, flash drive or the like. Some or all of sensors 202 and their associated electrical/electronic components are integrated within or connected by a printed circuit board. The sensors 202 are configured for wireless data transmission and connect wirelessly to the other components of control system 100. Alternatively, sensors 202 may be configured for wired data transmission. Importantly, primary sensors 202 are configured to record data, for example data related to inertial movement, in a synchronized manner from their respective, differing locations, typically using common reference points such as time-synchronized GPS data. This feature is important for autonomous control of a weight-shift control, flex wing aircraft such as aircraft 10 because the control system 100 requires information regarding the movement of various aircraft components with respect to each other in order to control the aircraft and is absent in conventional control systems for autonomous aircraft.

Whereas a typical flight controller for a rigid body/wing aircraft may function adequately by measuring the altitude, movement, and behavior of the aircraft from a single point in the aircraft structure typically near the centre of mass, in a weight-shift control, flex-wing aircraft such as aircraft 10, the control system 100 including flight controller 240 must receive information on the shifting centre of mass and the movement of the fuselage 8 with respect to the wing 16 and of the flexing of the wing 16, all of which affect the direction and maneuvering of the aircraft 10. Without such information collected from a synchronized sensor network such as primary sensor network 200 and secondary sensor network 230, the control system 100 would be unable to interpret parameters that affect the heading, speed, and altitude of the aircraft 10 and would therefore be unable to issue effective commands to the actuators 60, 80, 130/150, and 170 to correct course heading and perform other actions.

Control system 100 also responds to additional sensors that form a secondary sensor network 230. Secondary sensors 232 detect parameters relating to aircraft performance, operation, and status such as internal aircraft temperature, door open/closed status and others. Secondary sensors 232 are optionally connected or synchronized with each other, with either wired or wireless data transmission. Furthermore, sensors 232 transmit data with the other components of control system 100 such as primary flight controller 240 and communications system 242. Sensors 232 are connected to the engine and payload areas 34 and 38, respectively of the aircraft 10 (FIG. 1), and are adapted to read engine Controller Area Network (CANbus) data, internal temperature and pressure of the payload container, door open or shut confirmation, and other data which can be detected by an electronic sensor.

Control system 100 also includes a primary flight controller 240 which may be a central computer or other computing device which is configured to run software or other algorithms including the software and algorithms to control the various actuators and components described herein. Primary flight controller 240 may contain a separate digital memory and a separate processor (not shown) which contain computer-readable instructions. The processor of primary flight controller 240 is in communication with the memory and configured to execute computer instructions stored in the memory, the computer instructions causing the processor to control the operation of the aircraft by controlling the operation of the various actuators described herein.

Primary flight controller 240 receives data by electronic means from primary and secondary sensors 202 and 232. Controller 240, by means of mathematical equations or algorithms in its software program, can relate the movement and/or position of individual sensors 202 and 232 to a central point in space on the aircraft 10, such as the centre of mass of aircraft 10 at any point in time, as the sensors communicate with each other and the controller by means of a wi-fi router 250 and/or wired connection. Controller 240 can discriminate between the data streams received from each sensor 202, 232 as necessary to interpret the physical position and speed of motion of relevant parts of the aircraft 10 with respect to each other, the central point, and the environment to determine whether the aircraft component positions are such that they conform to a pattern necessary to maintain heading, speed, and altitude to a predetermined destination as programmed into controller 240. The ability to receive and interpret data from the synchronized sensor network 200, 230 may also provide advantages in non-flight or taxiing conditions that may be experienced by embodiments of aircraft 10 that are configured to alight on or take-off from water for example by having retractable wheel gear 36 or replacing wheel gear 36 with slender float pontoons as would be known in the art. In these circumstances, the movement of waves may be prevented from causing wing tips 22a, 22b to dip into the water as the controller 240 is able to compensate by using one or more of the actuators described herein to shift the position of the fuselage 8 with respect to the wing assembly 6.

Communications system 242 which is connected electronically to primary flight controller 240 and sensors 202 and 232, and can receive data from sensors in one or both of the primary and secondary sensor networks 200, 230, and primary flight controller 240, and transmit such data to remote locations such as a remote server (not shown).

Control system 100 controls the operation of actuators 60, 80, 130/150, and 170. Communications system 242 transmits data related to the position and health of the aircraft and payload as drawn from both the primary and secondary sensor networks 200, 230, and related to the commands given by primary flight controller 240 to the various actuators 60, 80, 130/150, and 170 and to the engine 34 (FIG. 1), and also receives and transmits results of such commands as measured by all sensors and the feedback mechanisms of the actuators 60, 80, 130, 150 to the remote server (not shown).

Control system 100 also includes a secondary flight controller 118 which can also control the operation of the aircraft. A set of two potentiometer devices 216 are affixed to the fuselage 8 of the aircraft 10, each containing a measuring cable, spool, spring, and rotational sensor. Unwinding of the cable causes the spool and sensor shafts to rotate, creating an electrical signal proportional to the cable's linear extension or velocity. The ends of the cables of each device are attached at specified points on the wing, and the devices are connected by electronic means to a computer of the secondary flight controller 118 that is separate from the primary flight controller 240. The computer of secondary flight controller 118 is connected by electronic means to the communications system 242 and to any one of the actuators 60, 80, 130/150, and 170 described herein. In addition, two inclinometer sensors 220 are attached to the wing 16 and fuselage 8 respectively of the aircraft 10, and connected by electronic means to the same separate computer of the secondary flight controller 118. Control system 100 may also include a compass 222 for navigation of aircraft 10. By means of algorithms, the computer of secondary flight controller 118 is able to calculate the angular position of the fuselage 8 relative to the wing 16, and the angles of both relative to the ground (horizontal position). These data allow a calculation that, based on empirical experience, shows whether the aircraft will remain in approximate level flight or requires adjustment via one or more of the actuators 60, 80, 130/150, and 170 to achieve relative wing and fuselage positions that will result in approximately level flight, or result in some other flight direction as measured by the compass.

Figure 16:
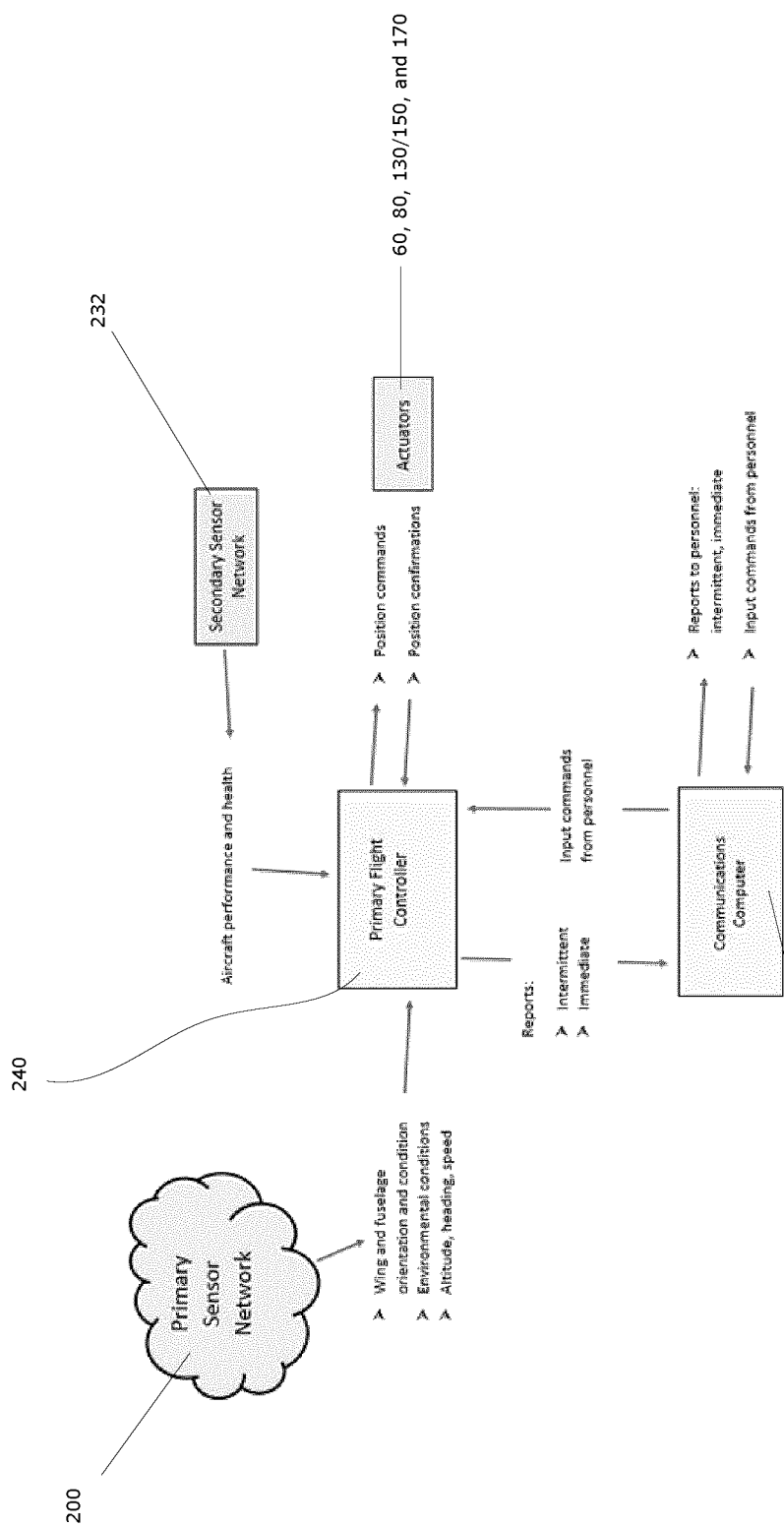
FIG. 16 is a diagrammatic view showing the data flow in a UAV flight control system, in accordance with an example embodiment.
Figure 17:
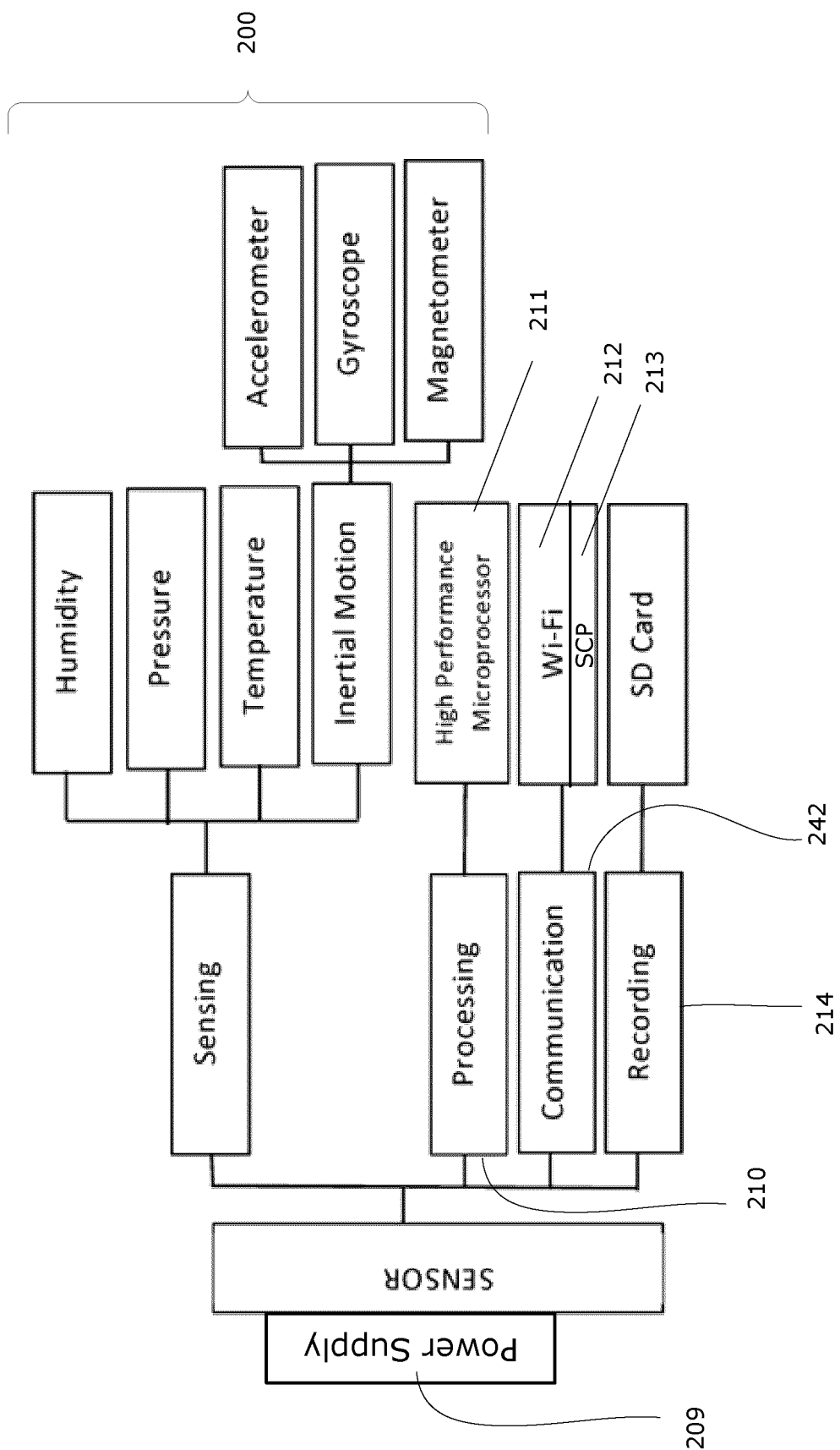
FIG. 17 is a block diagrammatic view of the primary sensor network of FIG. 15.

Referring to FIG. 16, an example of data flow to and from control system 100 is shown. Control system 100 receives data from primary and secondary sensors 202 and 232 relating to the orientation and condition of wing 16 and fuselage 8, environmental conditions, altitude, heading, speed, location, position and other variables. Control system 100 is in bi-directional communication with the actuators 60, 80, 130/150, and 170. Position commands are relayed from the primary flight controller 240 to actuators 60, 80, 130/150, and 170. The actuators 60, 80, 130/150, and 170 in turn transmit data back to controller 240 that confirmations the position of the individual actuators. Controller 240 is also in bi-directional communication with communications computer 242, which in turn can receive input commands from personnel through the communications system 242 directing the aircraft to a new, approximate altitude or location. Controller 240 may also relay resulting reports either intermittently, or immediately depending on the nature of the data collected, regarding maneuver commands and results through communications system 242 to ground personnel who may be monitoring the progress of the flight. For example, an intermittent report may be sent where there is no unusual change in speed of the aircraft 10. An immediate report may be sent if there is a sudden change in speed, direction or orientation of aircraft 10.

Figure 18:
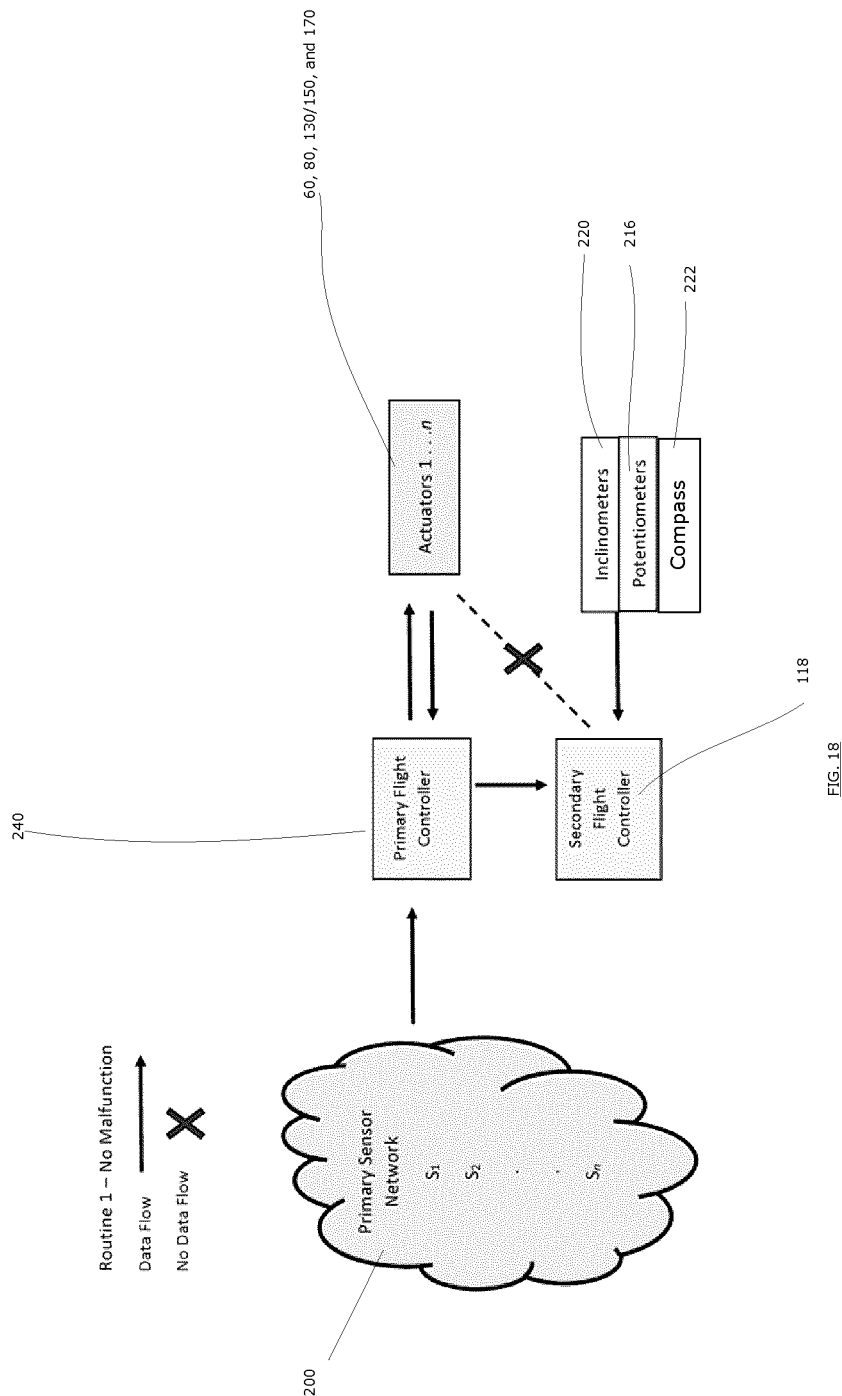
FIG. 18 is a block diagrammatic view of operation of the flight control system.
Figure 19:
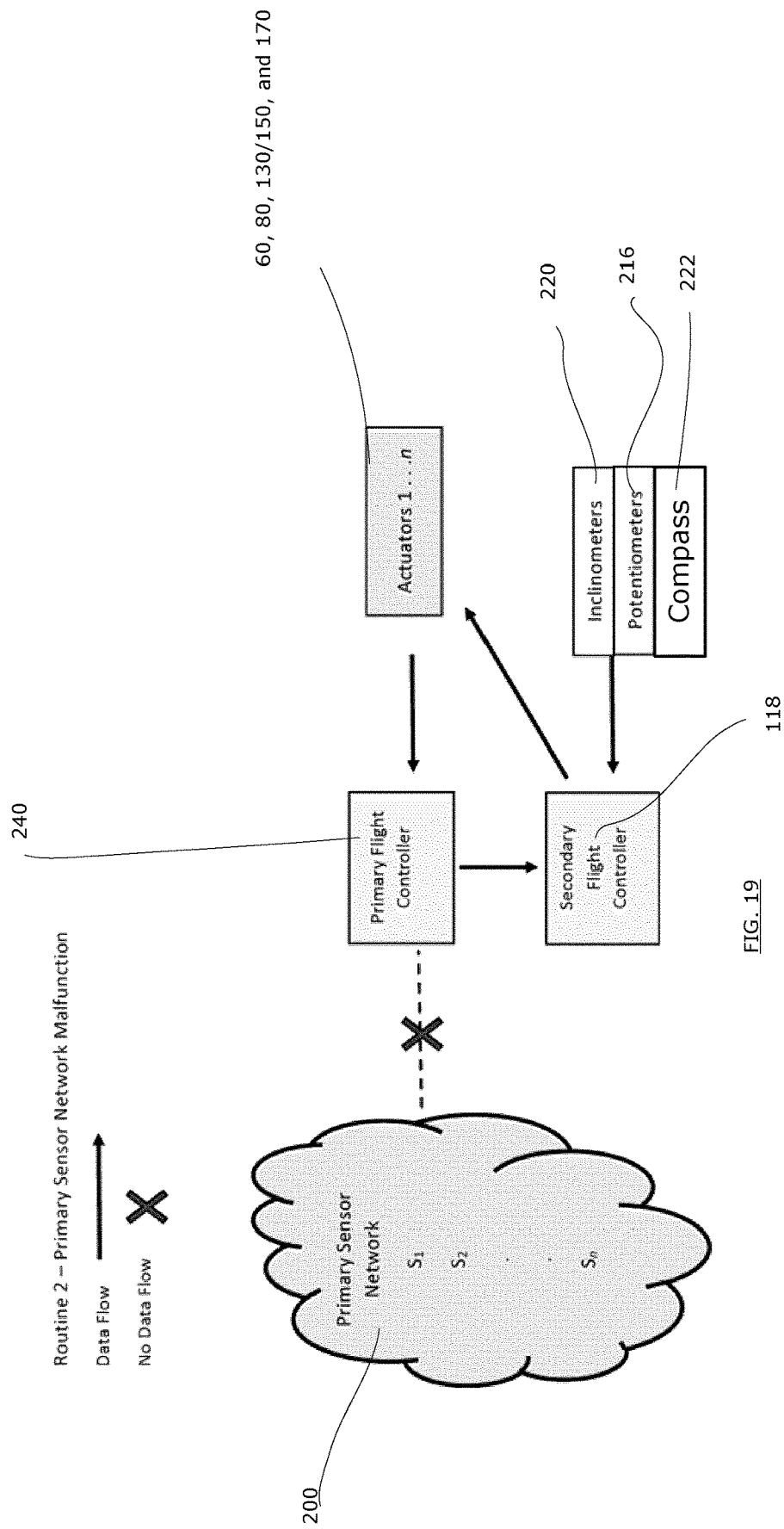
FIG. 19 is a block diagrammatic view of operation of the flight control system.
Figure 20:
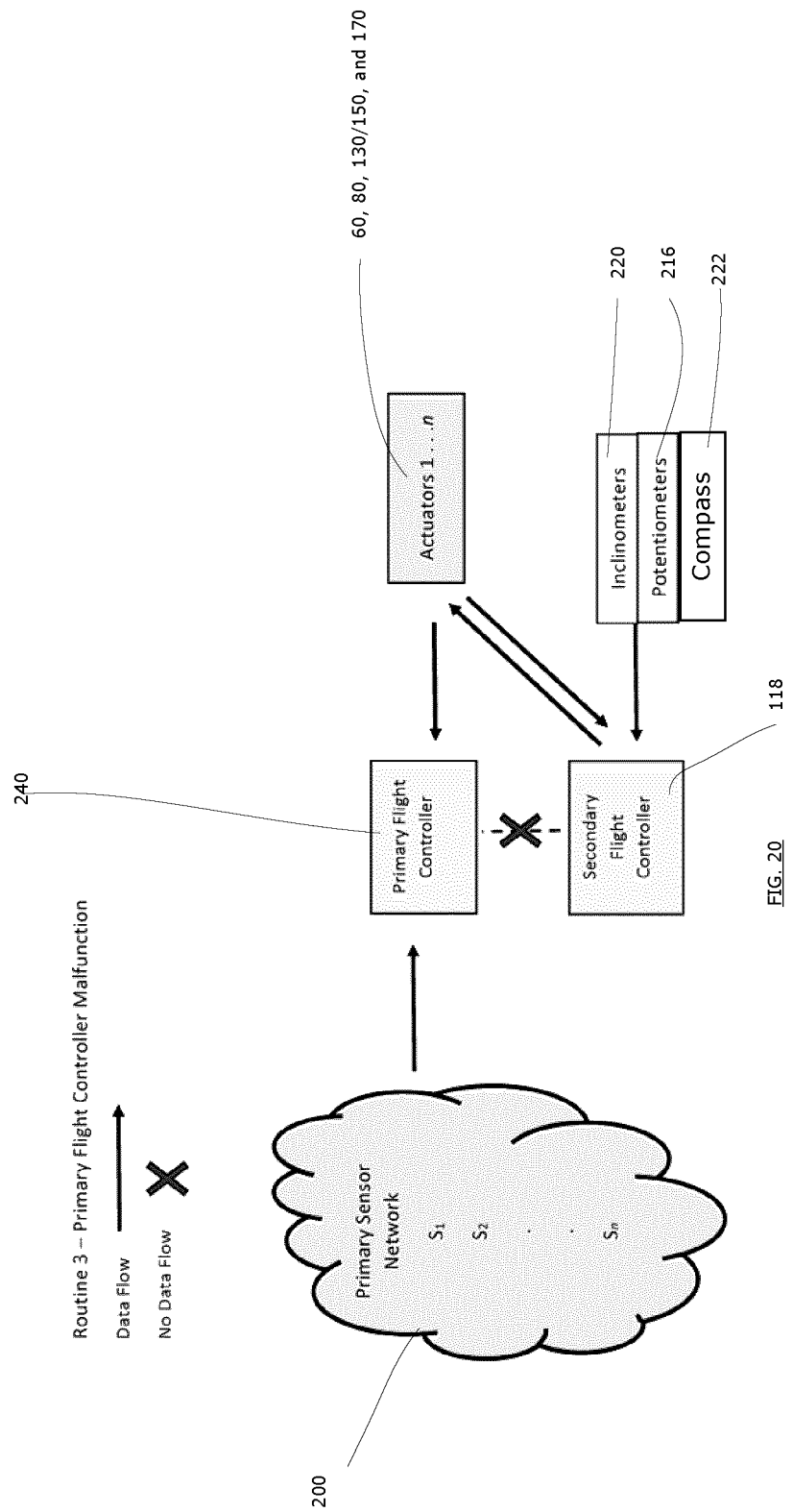
FIG. 20 is a block diagrammatic view of operation of the flight control system, in accordance with an example embodiment.

During normal operation, as shown in FIG. 18, when primary flight controller 240 is operational, there is no data flow between the various actuators 60, 80, 130/150, and 170, and secondary flight controller 118. In this mode, aircraft 10 is controlled solely through the operation of and bidirectional communication between the various actuators and primary flight controller 240 based on information received from primary sensor network 200 and secondary sensor network 230, which is relayed to controller 240.

In the event of a failure or shutdown of primary flight controller 240 for any reason while the aircraft is in operation (shown in FIG. 20), or in the event of a failure or shutdown of primary sensor network 200, the loss of instruction and commands from primary flight controller 240 or from primary sensor network 200 triggers an application of commands from the computer of secondary flight controller 118 to some or all of actuators 60, 80, 130/150, and 170 while relying on the potentiometers 216, compass 222 and inclinometers 220, and transmission of this event to ground personnel via the communications system 242. The separate computer of flight controller 118 may then accept input of commands received from personnel through the communications system 242 directing the aircraft to a new, approximate altitude or location.

In some embodiments, controller 240 can be electronically connected to another computer that is in turn connected to two or more on-board cameras and a GPS unit. The computer can accept, process, and store for later access images from the cameras by time-stamping them using the GPS clock that is synchronized with the other GPS sensors on the aircraft 10 which may be part of primary sensor network 200. The cameras may be pointed at mechanical or electronic devices, or to general portions of the aircraft 10, or outward toward the ground or environment. In this manner, the computer creates a visual record of events on the aircraft 10 or in the environment that can be time synchronized with the sensor data received by controller 240 from the primary and secondary sensor networks, 200 230, and analyzed by maintenance, engineering, or other personnel at various times to assess UAV performance characteristics or malfunctions.

Figure 23:
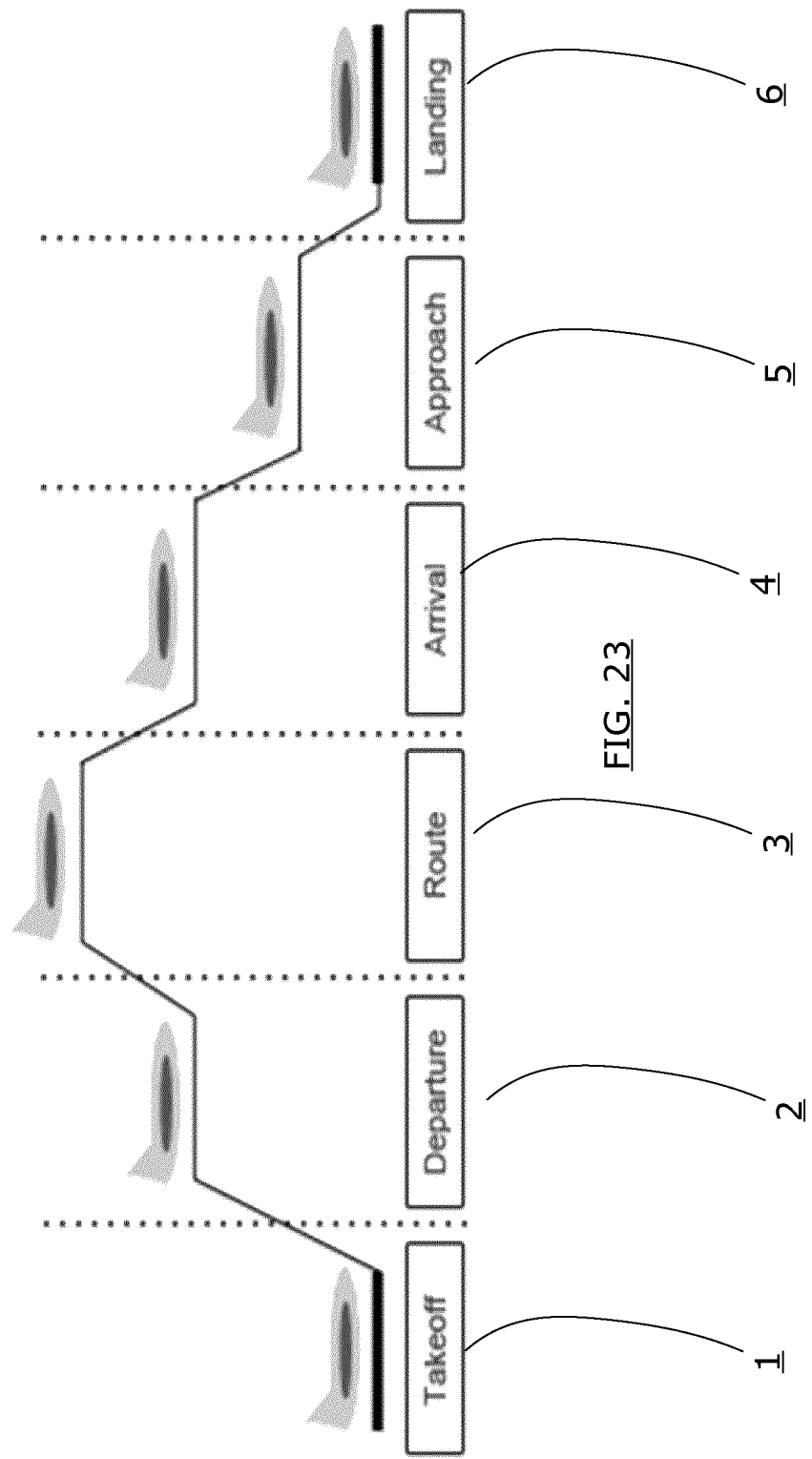
FIG. 23 is a schematic depiction of actuation system preference routines during various flight stages.

Aircraft 10 can maneuver by means of a combination of the actuators and flight control systems described herein. In addition, maneuverability in flight and reliable functioning of the aircraft to complete its mission may be assured by the use of a particular system, and given its possible failure, the use instead of another system for maneuvering, that is, there is redundancy of flight control. A typical flight routine showing the redundancy of flight controls is shown schematically with reference to FIG. 23:

| Stage: | Preferred actuator(s) | Backup/redundant actuator(s) |
|---|---|---|
| 1. Takeoff | Motor/reel, linear | wing body, axle strut, wing tip, or winglet actuators |
| 2. Departure | motor/reel, linear | wing body, axle strut, wing tip, or winglet actuators |
| 3. Route | wing tip, winglets | wing body, axle strut |
| 4. Arrival | wing tip, winglets, wing body | axle strut, motor/reel, linear |
| 5. Approach | motor/reel, linear, | axle strut, wing body, wing tip, winglets |
| 6. Landing | motor/reel, linear | axle strut, wing body |

The flight controller algorithms programmed into controller 240 compare the movements and position of components of the aircraft such as the wingtips 22a and b, wing 16 and fuselage 8 with commands sent to the actuators 60, 80, 130/150, and 170, and the confirmation of positions of the various actuators as sent by the encoders (not shown), and with environmental data, to determine whether aircraft component movements as reported by the primary sensor network 102 are caused by environmental factors or by primary flight controller 240 commands, and compares this actual position data to desired states to determine if further commands should be sent to achieve course corrections.

Figure 21:
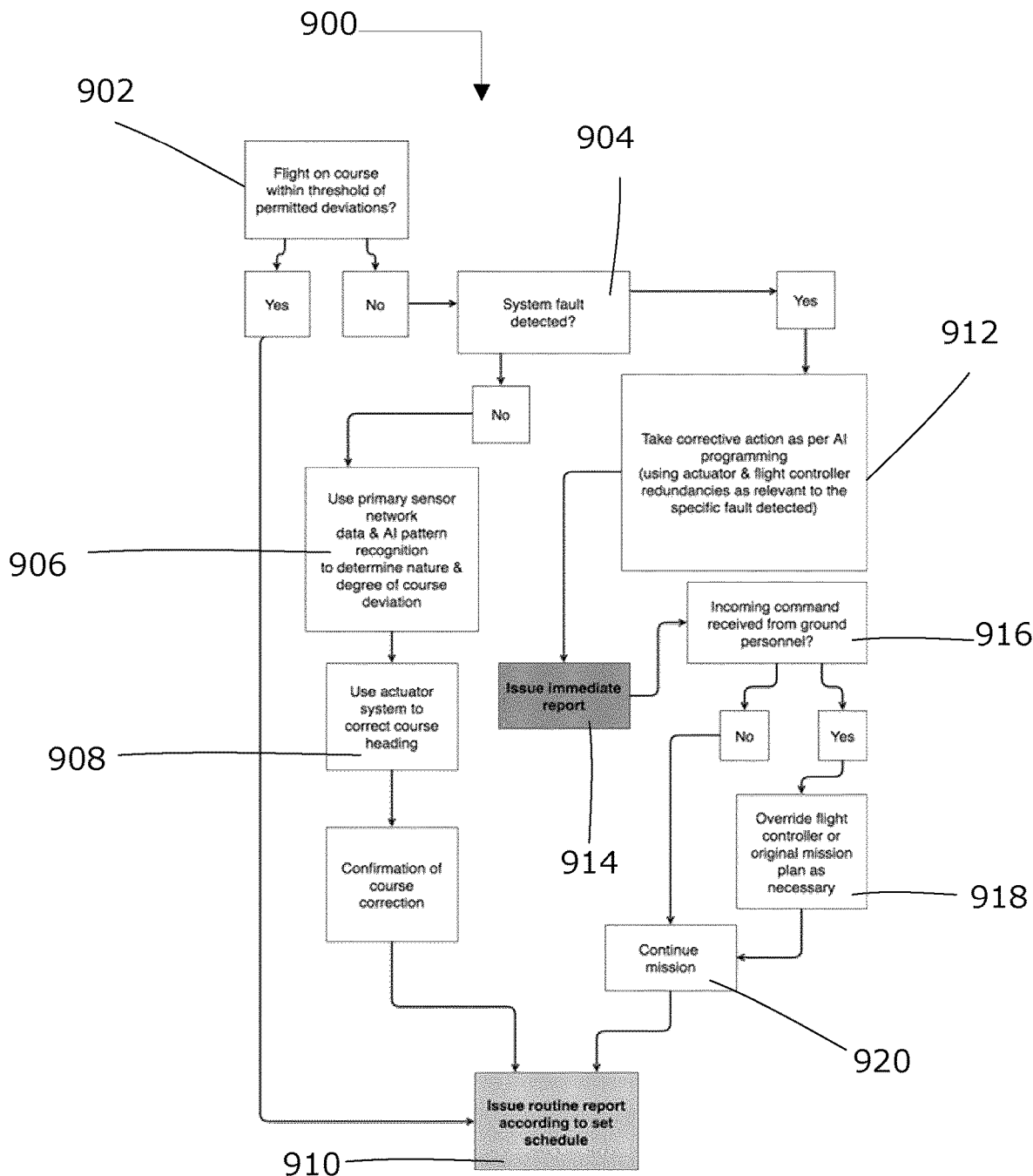
FIG. 21 is a flight control logic flowchart.

FIG. 21 shows a sample flight control logic flowchart 900 by which Control system too operates and controls aircraft to. As seen in FIG. 21, at step 902, control system 100 determines whether aircraft to is on course within thresholds of permitted deviations. If aircraft to is not on course, control system too assesses whether there is a system fault at step 904. If a system fault is not detected, at step 906, control system 100 uses data collected from the primary sensor network 200 and artificial intelligence algorithms to determine the nature and degree of course deviation. At step 908, control system too then uses any of the actuators described herein to correct course heading and issues a routine report according to a predetermined schedule, at step 910. If aircraft to is determined to be on course at step 902, control system 100 takes no corrective action and issues a routine report according to a predetermined schedule at step 910.

If at step 904, a system fault is detected, at a further step 912, control system 100 takes corrective action based on the algorithms described herein and which are used to control the actuators of aircraft to and issues an immediate report at step 914.

At step 916, control system too assesses whether commands or control routines have been received from ground personnel or remote server and if yes, at step 918, control system too overrides primary flight controller 240 of aircraft to or changes the mission plan as necessary based on the commands and control routines received from ground personnel.

If no commands or control routines are received from ground personnel or via the remote server, at step 920, aircraft to continues its autonomous or pre-programmed mission and sends routine reports as described herein.

Figure 22:
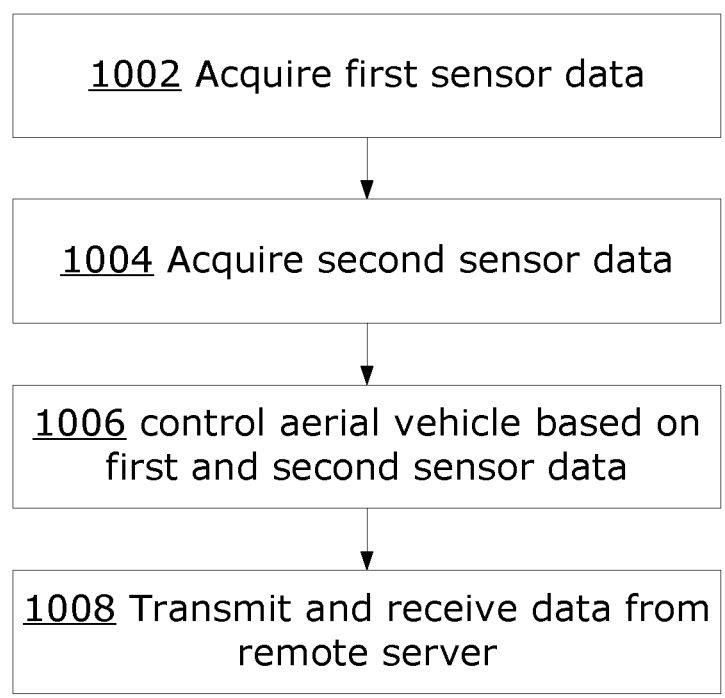
FIG. 22 is a flowchart of a method of controlling an aircraft.

FIG. 22 illustrates a method 1000 for controlling aircraft to. At step 1002, data is acquired from primary sensors 200. At step 1004, data is acquired from secondary sensors 232. Controller 240 controls operation of the aircraft at step 1006, in response to data from the primary and secondary sensors, using the algorithms described herein. At step 1008, data is optionally transmitted or received from a remote server and to control the aerial vehicle remotely at step 1006.

Figure 24:
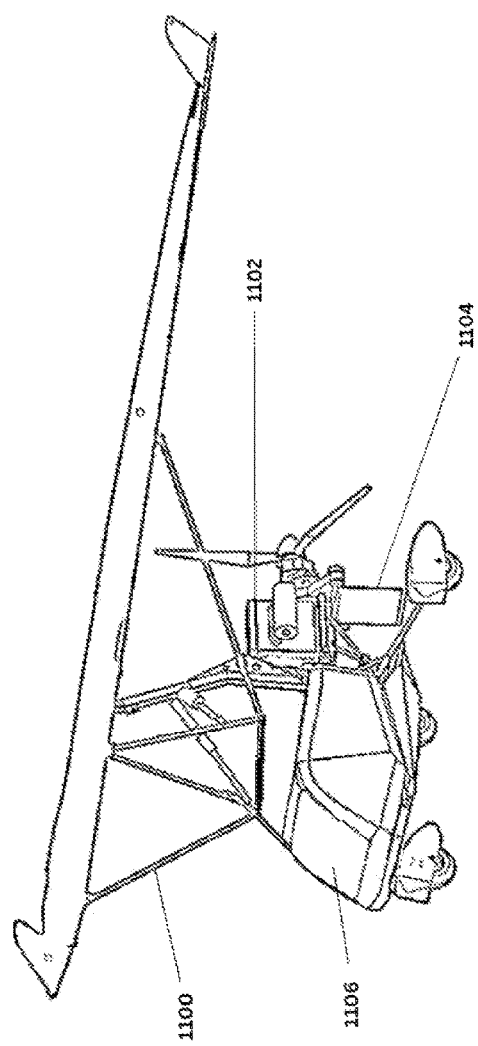
FIG. 24 is a perspective view of an aircraft according to a second embodiment.
Figure 26:
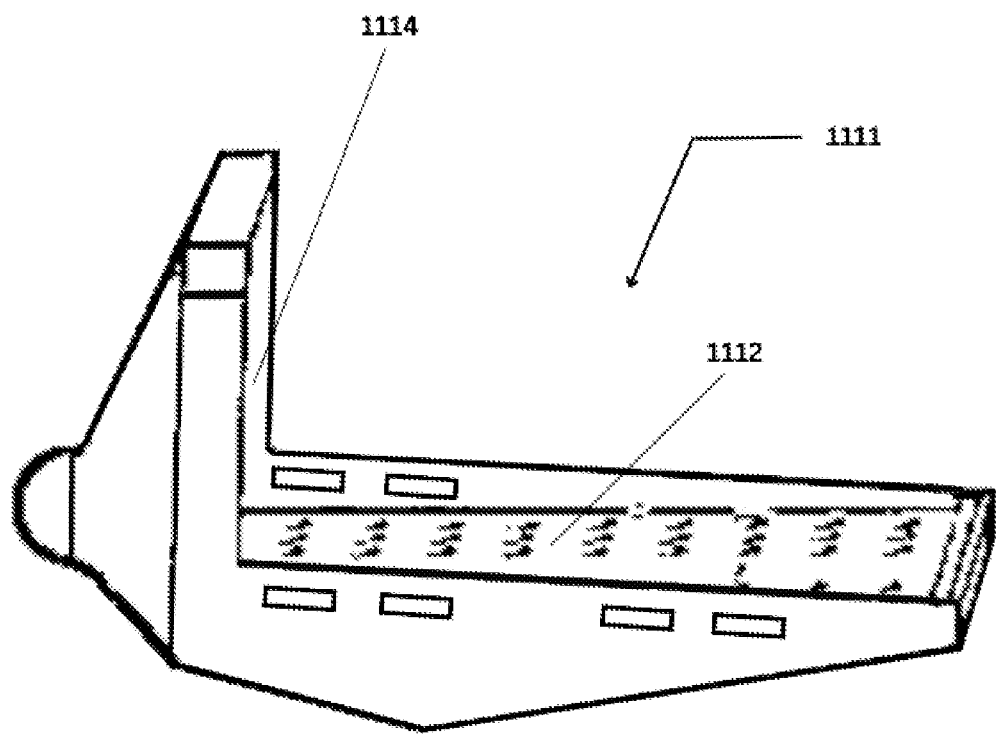
FIG. 26 is a perspective view of a portion of the cargo bay of the aircraft of FIG. 24.

In one embodiment shown in FIGS. 24 to 26, fuselage 8 includes an open exoskeletal frame 1100. Frame 1100 is configured to independently and releasably secure engine 1102, fuel tank 1104, and cargo bay/pod 1106. Cargo bay 1106, more clearly shown in FIG. 25, consists of an enclosed pod that can be removeably attached to frame 1102 with mechanical fasteners (not shown) to permit loading and unloading independently of the aircraft. Fuselage 8 may further include an open tray-like cargo bay 1111 (FIG. 26) that includes a floor 1112 and low side walls 1114 that extend partway up the height of fuselage 8. Cargo placed within cargo bay 1111 is secured with straps or similar fasteners. In this way, aircraft 10 may carry oddly shaped or irregular items that cannot be accommodated within an enclosed cargo pod.

Referring now to FIGS. 31A and 31B, the frame 30 of fuselage 8 may be configured so that an engine mounting structure 300 permits the engine 34 to be fastened or fixed in one of two positions: forward or rearward. The engine 34 itself may be bolted to a plate 302, for example by four bolts 304. The plate 302 in turn may be fastened to the frame 30 of the aircraft 10 by vibration dampening mounts 306a, 306b, in industry commonly referred to as lord mounts that would fit into and be bolted through, for example, four larger openings 308 in the plate. The frame 30 is fitted with four holes (308) to accept these bolts in the rearward position (when mounts 306b are engaged) and four more holes so that the entire plate 302 with engine 34 can be moved to a forward position (when mounts 306a are engaged). The change of position will affect the centre of mass of the aircraft 10 so that excessively heavy or light cargo loads can be partially or totally compensated, promoting the most efficient operation of the aircraft. This is possible because the load is in front of the central mast (for example mast 96) of aircraft 10 while the engine 34 is behind the mast 96, or vice-versa, so that an imbalance of load can be compensated by moving the position of engine 34 as the engine 34 typically is heavy. In some embodiments, the rear or forward positioning of the engine 34 on its mounting plate 302 is accomplished by movement of locking rails fitted with rollers. The engine mounting plate 302 is fitted to the moving rails which in turn rest on rollers and are fastened to the frame 30 of aircraft 10. That is, the rails fitted with rollers are located under the mounting plate and above the fixed rails that are part of the frame 30 of aircraft 10, and are secured so that the moveable rails can only move forward and rearward by a prescribed, limited distance. The rails might be moved by means of locking linear actuators for example linear actuators 130 that can be activated by computerized and/or automated means in response to a load imbalance condition detected by the primary or secondary sensor networks.

Figure 32:
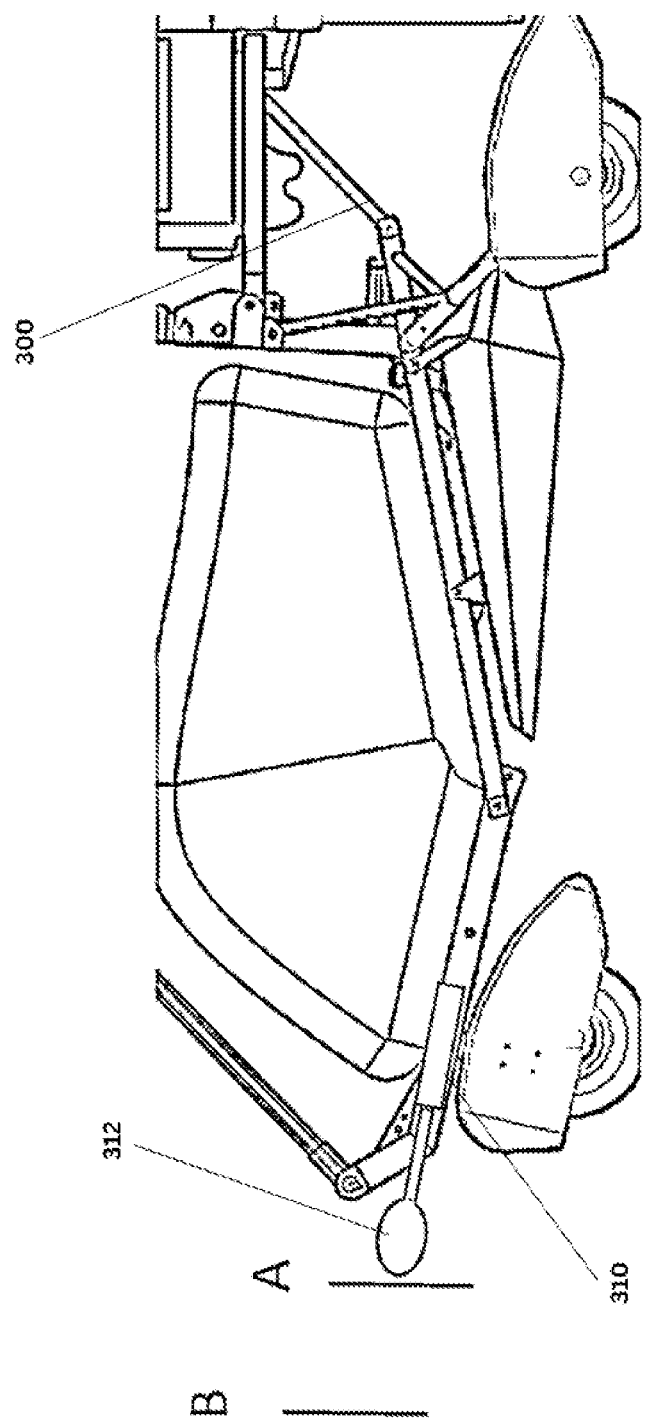
FIG. 32 is a perspective view of an embodiment of an aircraft in showing a portion of the frame.

Referring to FIG. 32, the frame 30 of aircraft 10 may be configured so that the forward-most section underneath the cargo pod area contains a telescoping, locking rail 310 with an aerodynamically streamlined dead weight (ballast 312) affixed at the forward end of the rail 310, such as a tear drop shaped deadweight. Ballast 312 acts as a dynamic counterweight system, or as is referred to in the art, a moment arm. Extending the rail 310 from retracted position A to forward position B causes the weight of the aircraft 10 to move farther in front of the aircraft 10. This change of position shifts the centre of mass of aircraft 10 forward so that light cargo loads or empty cargo conditions can be partially or totally counterbalanced, promoting the most efficient operation of the aircraft 10. The weight is retracted to position A in the event that the aircraft 10 is loaded with heavy cargo as no counterbalance is needed between the engine 34 and the cargo bay 38 which are behind and forward of the central mast 96 respectively. In a tractor configuration of the aircraft 10 in which the engine 34 is in front of the mast 96, the dynamic counterweight system is reversed so that the deadweight is extended behind the aircraft 10 in the event of light loading conditions.

Figure 33:
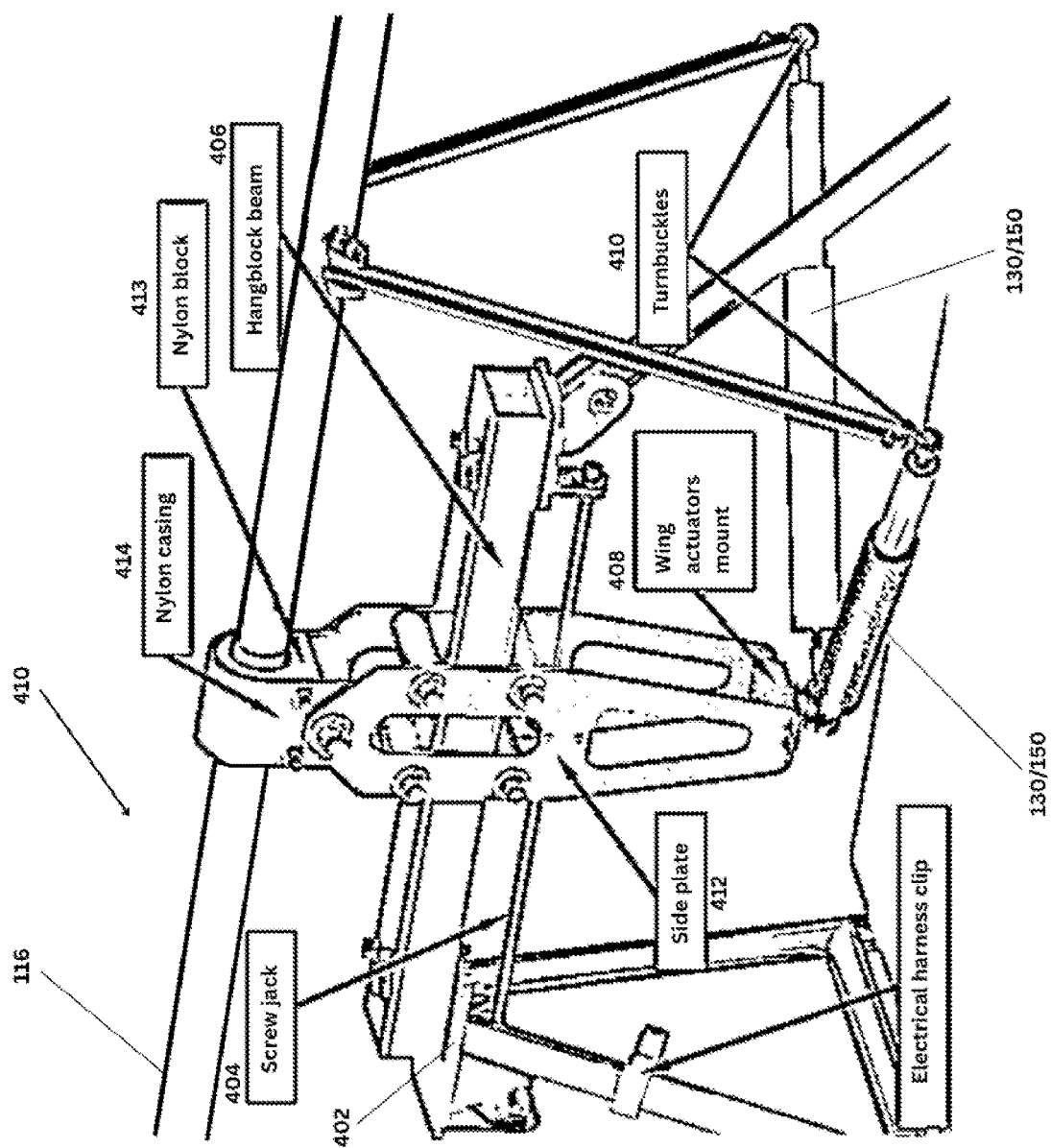
FIG. 33 is a perspective view of a second embodiment of the fuselage joint assembly of FIG. 8.

FIG. 33 shows an alternative configuration of the fuselage joint structure of FIG. 8 for connecting the wing assembly 6 to the frame 30. As shown in FIG. 33, the upper part of the frame 30 may be configured so that the wing/fuselage joint structure 410 includes a horizontal rail 402 upon which a linear actuator assembly including rollers, a side plate 412 and a screw jack 404 can be moved toward the front or rear of the aircraft 10. The upper portion of the assembly above the rail includes a hang block 406 through which the wing keel 116 is held, and a nylon block 413 encased in a nylon casing 414. This hang block 406 is of similar design to one that would be used in an embodiment of the aircraft without such a horizontal rail 402, so that it permits two degrees of freedom of movement (pitch and roll of the wing 16). The lower portion of the assembly below the rail includes a mount 408 to hold in place the ends of two linear actuators such as 130/150. The other ends of the linear actuators are connected to the aircraft's control bar for example control bar 19 (FIG. 9) by means of turnbuckles 410. When the entire assembly is moved forward or rearward on the rail 402 by means of the screw jack 404, the centre of mass of the aircraft 10 shifts relative to the position of the wing assembly 6 so that excessively heavy or light cargo loads can be partially or totally counterbalanced, promoting the most efficient operation of the aircraft.

In some embodiments of aircraft 10, the aircraft 10 can include a tube/hose that runs from a gas tank up alongside or within the mast 96, through a sealed hole in the wing fabric 42, and then to some other position inside the wing 16. It may run either forward or backward along the central wing keel structure 18 to an appropriate juncture, and then upward through another sealed hole in the wing fabric 42, on top of the wing 16. Typically, this exit point is at the front, top, and centre area of the wing 16 but may also be at a wing tip region 24, 26. The tube may terminate inside a solid probe fitted with toggles and a valve of the sort normally used in probe-and-drogue aerial refueling systems. In addition, a coiled and extendible hose may also be connected to fuel tank such as for example fuel tank 1104 (or cargo bay area, if the cargo consists of an additional fuel tank) housed on the frame 30 of the aircraft 10. The outermost end of the hose may be fitted with a drogue and valve such as a poppet valve as normally used in probe-and-drogue aerial refueling systems. The hose can be unreeled and extended behind the aircraft 10 in flight. In the pusher-propeller embodiment, the hose is extended rearward through the hub of the propeller 32. In the tractor-propeller version of aircraft 10, the hose extends from the lower-rear section of the aircraft 10 (the fuel and/or cargo area). In this manner, aircraft in a fleet may refuel each other, and can be configured to send and/or receive fuel, and thereby remain aloft for long periods of time.

The embodiments shown in FIGS. 24 to 29 show that aircraft 10 can be adapted with a detachable, interchangeable fuselage 8 hung beneath the wing 16 as required for particular missions. Such fuselages may include a detachable cargo pod with an external frame, cargo pods with internal environmental controls for transportation of food and essential supplies, an open tray cargo pod (FIG. 25) having attachment points for straps in order to secure bulky and irregular shaped objects for transportation, fuselage with internal frame, fuselages with pressure and temperature control and seat(s) to carry passenger(s), and/or reclined seats or bed with medical sensors for autonomous transportation of incapacitated persons.

Figure 27:
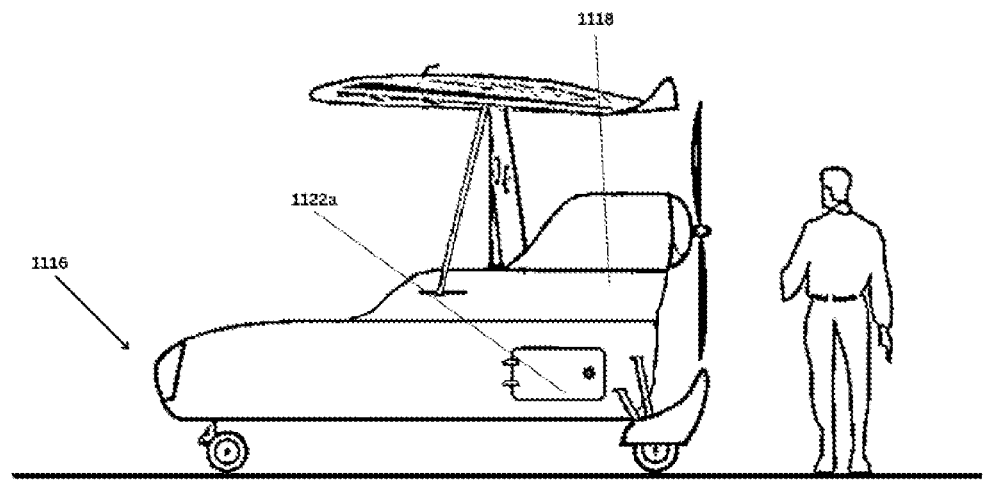
FIG. 27 is a side perspective view of an aircraft according to a third embodiment.
Figure 28:
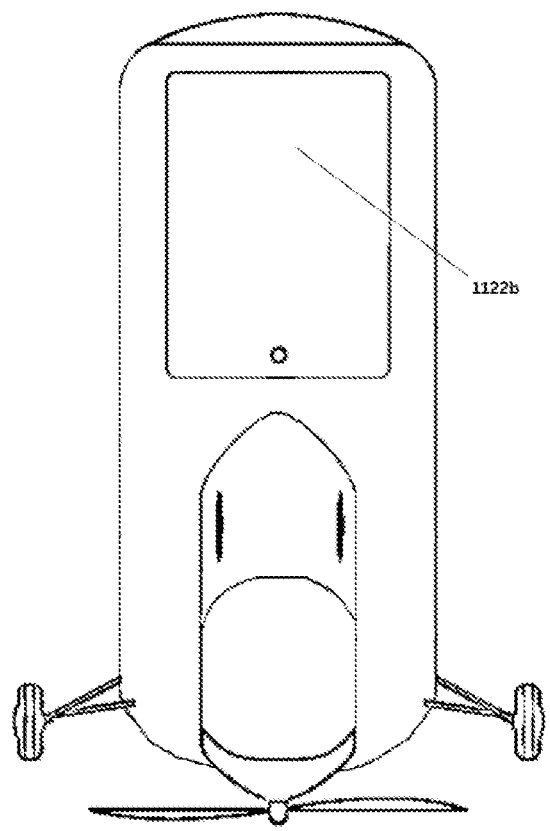
FIG. 28 is a top perspective view of the aircraft of FIG. 27.

Another embodiment shown in FIGS. 26, 27 and 28 provides a fuselage 1116 having an enclosed shell 1118 that contains within it an internal frame to which the shell is attached and that fully encloses the engine and/or fuel tank. These components may be attached to the fuselage frame. The interior of the shell 1118 accommodates payload and can be accessed via one or more compartment doors 1122a and b.

Figure 29A:
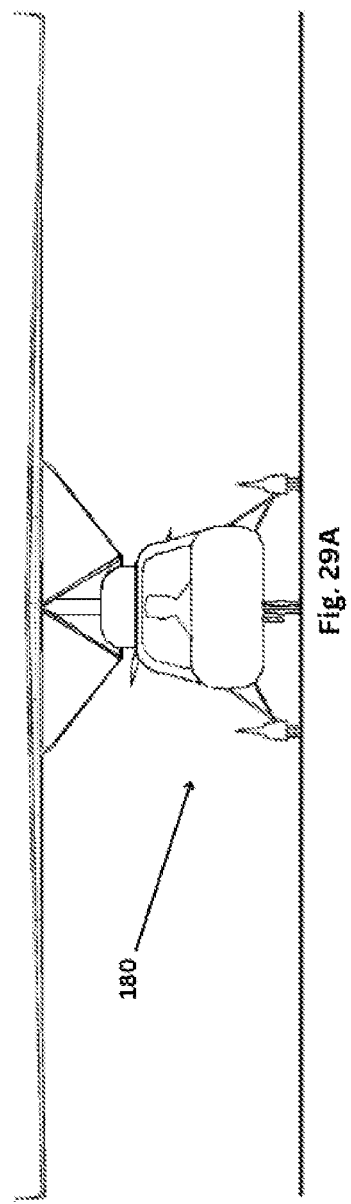
FIG. 29A is a front perspective view of an aircraft according to a fourth embodiment.
Figure 29B:
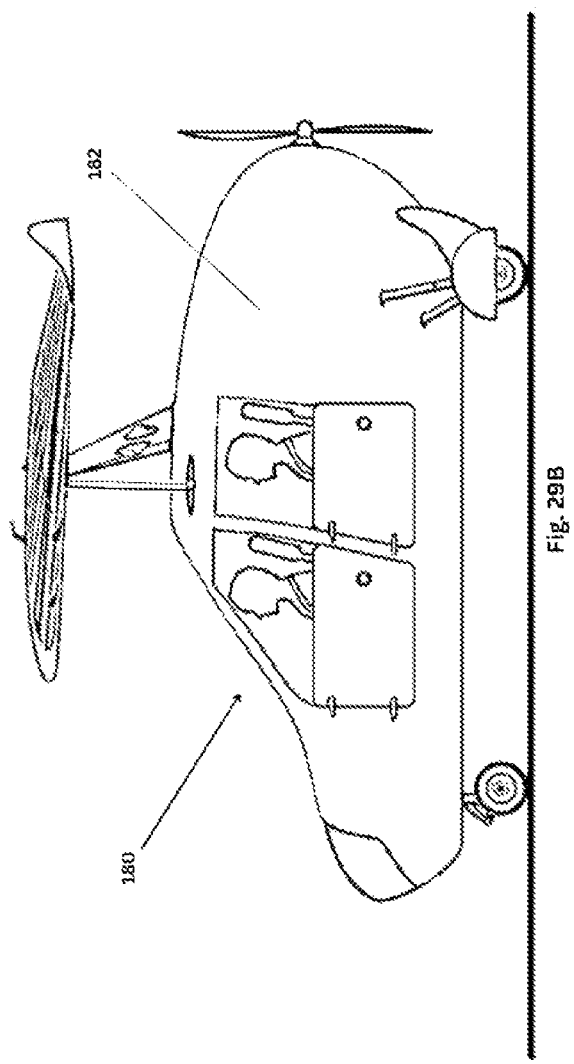
FIG. 29B is a side perspective view of the aircraft of FIG. 29A.

Another embodiment shown in FIGS. 29A and 29B includes a fuselage 180 that consists of an enclosed shell 182 with seats for passengers, flight data displays and telecommunications equipment, and life support systems including oxygen and temperature control. In some embodiments, the shell 18 may include a reclining seat or bed to accommodate incapacitated person(s) and may further include within the interior, medical sensors related to the patient's heart rate, breathing, temperature, and other health indicators or life support systems, connected electronically to the communications system which is programmed to report sensor readings and/or data summaries at regular intervals to remote personnel who may be monitoring the flight, and/or on an expedited basis if sensor readings depart from pre-set parameters.

The above discussed embodiments are considered to be illustrative and not restrictive. Example embodiments described as methods would similarly apply to systems, and vice-versa.

In the block diagrams herein, the boxes represent events, steps, functions, processes, modules, messages, and/or state-based operations, etc. While some of the present examples have been described as occurring in a particular order, it will be appreciated by persons skilled in the art that some of the steps or processes may be performed in a different order provided that the result of the changed order of any given step will not prevent or impair the occurrence of subsequent steps. Furthermore, some of the messages or steps described above may be removed or combined in other embodiments, and some of the messages or steps described above may be separated into a number of sub-messages or sub-steps in other embodiments. Even further, some or all of the steps may be repeated, as necessary. Elements described as methods or steps similarly apply to systems or subcomponents, and vice-versa. Reference to such words as "sending" or "receiving" could be interchanged depending on the perspective of the particular device.

Variations may be made to some example embodiments, which may include combinations and sub-combinations of any of the above. The various embodiments presented above are merely examples and are in no way meant to limit the scope of this disclosure. Variations of the innovations described herein will be apparent to persons of ordinary skill in the art, such variations being within the intended scope of the present disclosure. In particular, features from one or more of the above-described embodiments may be selected to create alternative embodiments comprised of a sub-combination of features which may not be explicitly described above. In addition, features from one or more of the above-described embodiments may be selected and combined to create alternative embodiments comprised of a combination of features which may not be explicitly described above. Features suitable for such combinations and sub-combinations would be readily apparent to persons skilled in the art upon review of the present disclosure as a whole. The subject matter described herein intends to cover and embrace all suitable changes in technology.

The invention claimed is:

1. An aircraft comprising: a continuous wing assembly extending from port to starboard sides of the aircraft, a fuselage suspended from the wing assembly, the wing assembly comprising a flexible wing body, at least one wing actuator connected to the wing assembly and adapted to flex the wing to control flight of the aircraft, a fuselage two-axis joint connecting the fuselage to the wing assembly to permit the fuselage to rotate in two mutually orthogonal axes of rotation relative to the wing assembly, wherein a first orthogonal axis is about a first horizontal axis for permitting roll of the fuselage relative to the wing assembly and a second orthogonal axis is a second horizontal axis orthogonal to the first axis for adjusting pitch of the fuselage relative to the wing assembly, wherein the fuselage two-axis joint permits the fuselage to move independently of the wing assembly, a fuselage actuator connecting the fuselage and wing assembly to pivot the fuselage relative to the wing assembly, at least one sensor mountable to the aircraft and configured to acquire data from one or more of a portion of the aircraft and an environment of the aircraft, and a control system adapted to actuate the wing and fuselage actuators in response to signals from the at least one sensor whereby the flight of the aircraft is controlled by a combination of wing flexure and fuselage rotation relative to the wing assembly in response to signals from the at least one sensor.

2. The aircraft of claim 1 wherein the control system is adapted to accept and store programmed flight information and aircraft control instructions.

3. The aircraft of claim 1 wherein the wing assembly further comprises winglets extending upwardly from the opposing tips of the wing assembly, the winglets being rotatable about at least one axis of rotation relative to the wing body for providing additional control of the aircraft, said winglets being controlled by one or more actuators of the aircraft.

4. The aircraft of claim 3 wherein the winglets on the opposing tips of the wing assembly are independently rotatable between an upward extending position and a horizontal position in alignment with a plane of the wing assembly so that rotation of a winglet relative to an opposing winglet result in result in a flexing of the wing and maneuvering the aircraft.

5. The aircraft of claim 1 wherein the wing and/or fuselage actuators comprise retractable cables; one or both of linear or rotary electric actuators; or axle strut actuators.

6. The aircraft of claim 1 wherein the control system comprises:
a) memory; and
b) a primary flight controller comprising a processor in communication with the memory and configured to execute computer instructions stored on the memory, the computer instructions causing the processor to receive and transmit data from the processor to the at least one sensor, the primary flight controller being electrically connected to one or more actuators.

7. The aircraft of claim 6 further comprising a communications system mountable on the aircraft and in communication with the primary flight controller and a remote server, the communications system configured to receive and transmit data from the primary flight controller to the remote server.

8. The aircraft of claim 6 further comprising a secondary flight controller separate from the primary flight controller and operably connected to one or more actuators and communication system, the secondary flight controller configured to control one or more of the actuators independently of the primary flight controller.

9. The aircraft of claim 6 wherein the at least one sensor acquires one or more of position data, inertial movement, ambient temperature, humidity, speed, and direction and/or one or more of the plurality of sensors is mounted on one or more of a wing, a plurality of winglets, or a fuselage of the aircraft.

10. The aircraft of claim 6 wherein the processor is configured to relate the position data acquired from the at least one sensor to a reference position of the environment or the processor is configured to relate position data of one of the fuselage or wing assembly acquired from one of a plurality of sensors to a reference position of the other of the fuselage or wing assembly.

11. The aircraft of claim 6 wherein the processor is configured to simultaneously obtain data from the one or more sensors.

12. The aircraft of claim 1 wherein the one or more actuators controls one or more of the wing, winglets, fuselage, or a payload of the aircraft.

13. The aircraft of claim 12 wherein the one or more actuators alters a shape of the wing or winglets to move or morph the wing of the aircraft.

14. The aircraft of claim 1 wherein the fuselage is detachable from the aircraft.

15. The aircraft of claim 1 wherein the at least one wing actuator is adapted to flex the wing to increase or decrease the sweep angle of the wing.

16. A method of autonomously controlling flight of an aircraft, the aircraft comprising a flexible wing and a fuselage suspended from the wing and connected to the wing by a two-axis joint that permits rotation of the fuselage relative to the wing about two orthogonally opposed horizontal axes, wherein a first orthogonal axis is about a first horizontal axis for permitting roll of the fuselage relative to the wing assembly and a second orthogonal axis is a second horizontal axis orthogonal to the first axis for adjusting pitch of the fuselage relative to the wing assembly, the method comprising:
 a. acquiring data from a plurality of sensors;
 b. transmitting said data to a controller
 c. processing said data within the controller into aircraft control information; and
 d. transmitting said aircraft control information from the controller to aircraft control actuators that are responsive to said control information, wherein the actuators control the flight of the aircraft by one or more of rotating the fuselage relative to the wing about a combination of the first orthogonal axis and/or the second orthogonal axis and/or flexing the wing, wherein said rotation or wing flexure controls the aircraft flight.

17. The method of claim 16 further comprising transmitting data acquired from the plurality of sensors to a remote server and/or receiving data from the remote server.

18. The method of claim 17, further comprising controlling at least a portion of the aircraft based on data received from the remote server.

19. The method of claim 16 wherein the data is one or more of: aircraft position, inertial movement, mechanical function of one or more components of the aircraft, ambient temperature, internal temperature of one or more components of the aircraft, humidity, speed, and direction of travel.

20. The method of claim 19 further comprising relating the position data acquired from the plurality of sensors to a reference position of the aircraft relative to its environment or relating the position data of one of the fuselage or wing acquired from one of the plurality of sensors to a reference position of the other of the fuselage or wing.

21. The method of claim 16 wherein the fuselage rotation and/or wing flex are actuated by at least one linear actuator or a cable attached to the wing and/or fuselage, the cable being selectively tensioned or de-tensioned by a spool driven by a drive that is responsive to the aircraft control information.

22. The method of claim 16 wherein the wing comprises a continuous wing assembly which is partially or entirely flexible along substantially its entire length; the wing comprises a continuous wing assembly which is relatively rigid along a central region and relatively flexible at end regions; or the wing comprises upstanding winglets at the opposing wing tips, the winglets each being moveable relative to the wing body about one or both of a vertical and horizontal axis.

23. The aircraft of claim 22 wherein the winglets on the opposing tips of the wing assembly are independently rotatable between an upward extending position and a horizontal position in alignment with a plane of the wing assembly so that rotation of a winglet relative to an opposing winglet result in result in a flexing of the wing and maneuvering the aircraft.

24. The method of claim 16 wherein acquiring data from a plurality of sensors comprises acquiring the data simultaneously from the plurality of sensors.

25. The method of claim 16 further comprising transmitting said sensor data and aircraft control information to ground personnel and wherein the sensor data and aircraft control information is used for one or more of tracking a position of the aircraft, for historical and maintenance analysis and overriding the controller in response to an event.

26. The method of claim 16 wherein the aircraft control actuators comprises at least one wing actuator adapted to flex the wing to increase or decrease the sweep angle of the wing.

* * * * *